United States Patent
Wolff et al.

(10) Patent No.: US 10,640,113 B2
(45) Date of Patent: May 5, 2020

(54) SYSTEM AND METHOD FOR CONTROLLING A VEHICLE

(71) Applicant: General Electronic Company, Schenectady, NY (US)

(72) Inventors: Jeffrey John Wolff, Erie, PA (US); Timothy Brown, Erie, PA (US); Henry Young, Erie, PA (US); Lindsay Short, Erie, PA (US); Edward Thomas Petrak, Lawrence Park, PA (US); Ronald Fischer, Fairview, PA (US); Michael Wagner, Erie, PA (US); Justin Chadwell, Draper, VA (US); Carlos Vallejo, Erie, PA (US); Sean Cillessen, Erie, PA (US); Larry Bench, Casper, WY (US); Kenneth Paul Nedley, Lawrence Park, PA (US); Ajith Kuttannair Kumar, Erie, PA (US)

(73) Assignee: GE Global Sourcing LLC, Norwalk, CT (US)

( * ) Notice: Subject to any disclaimer, the term of this patent is extended or adjusted under 35 U.S.C. 154(b) by 290 days.

(21) Appl. No.: 15/796,960

(22) Filed: Oct. 30, 2017

(65) Prior Publication Data
US 2018/0065629 A1    Mar. 8, 2018

Related U.S. Application Data

(63) Continuation-in-part of application No. 14/974,430, filed on Dec. 18, 2015, now abandoned, which is a
(Continued)

(51) Int. Cl.
*B60W 30/14* (2006.01)
*B60L 50/40* (2019.01)
(Continued)

(52) U.S. Cl.
CPC .............. *B60W 30/146* (2013.01); *B60L 7/12* (2013.01); *B60L 7/26* (2013.01); *B60L 7/28* (2013.01);
(Continued)

(58) Field of Classification Search
CPC .............. B60W 30/146; B60W 10/18; B60W 30/18009; B60W 10/08; B60W 2530/10;
(Continued)

(56) References Cited

U.S. PATENT DOCUMENTS 6,731,084 B2    5/2004    Gagnon et al.
6,814,414 B1    11/2004   Schmitt et al.
(Continued)

FOREIGN PATENT DOCUMENTS

CN    102414069 A    4/2012
CN    102414069 B    4/2015
(Continued)

OTHER PUBLICATIONS

International Search Report and Written Opinion issued in connection with corresponding PCT Application No. PCT/US2017/059440 dated Feb. 9, 2018.
(Continued)

*Primary Examiner* — Frederick M Brushaber
(74) *Attorney, Agent, or Firm* — Josef L. Hoffman; The Small Patent Law Group, LLC

(57) ABSTRACT

A vehicle control system determines an upper non-zero limit on deceleration of a vehicle to prevent rollback of the vehicle down a grade being traveled up on by the vehicle. The upper non-zero limit on deceleration is determined by the controller based on a payload carried by the vehicle, a speed of the vehicle, and a grade of a route being traveled upon by the vehicle. The controller is configured to monitor the deceleration of the vehicle, and to automatically prevent
(Continued)

the deceleration of the vehicle from exceeding the upper non-zero limit by controlling one or more of a brake or a motor of the vehicle. The controller also is configured to one or more of actuate the brake or supply current to the motor of the vehicle to prevent rollback of the vehicle while the vehicle is moving up the grade at a non-zero speed.

20 Claims, 11 Drawing Sheets

Related U.S. Application Data continuation of application No. PCT/US2015/010756, filed on Jan. 9, 2015, and a continuation-in-part of application No. 14/464,226, filed on Oct. 14, 2014, now Pat. No. 9,227,515.

(60) Provisional application No. 62/480,590, filed on Apr. 3, 2017, provisional application No. 62/415,589, filed on Nov. 1, 2016, provisional application No. 61/925,733, filed on Jan. 10, 2014, provisional application No. 61/867,780, filed on Aug. 20, 2013.

(51) Int. Cl.
| | |
|---|---|
| *B60L 50/13* | (2019.01) |
| *B60L 50/61* | (2019.01) |
| *E02F 9/20* | (2006.01) |
| *B60L 7/12* | (2006.01) |
| *B60T 13/58* | (2006.01) |
| *B60L 7/26* | (2006.01) |
| *B60W 40/107* | (2012.01) |
| *B60W 10/18* | (2012.01) |
| *B60W 30/18* | (2012.01) |
| *B60L 15/20* | (2006.01) |
| *B60W 10/08* | (2006.01) |
| *B60L 7/28* | (2006.01) |
| *B60L 9/22* | (2006.01) |
| *B60L 58/12* | (2019.01) |
| *E02F 9/22* | (2006.01) |
| *B60T 7/12* | (2006.01) |

(52) U.S. Cl.
CPC ............ *B60L 9/22* (2013.01); *B60L 15/20* (2013.01); *B60L 15/2009* (2013.01); *B60L 15/2018* (2013.01); *B60L 15/2063* (2013.01); *B60L 15/2081* (2013.01); *B60L 50/13* (2019.02); *B60L 50/40* (2019.02); *B60L 50/61* (2019.02); *B60L 58/12* (2019.02); *B60T 13/586* (2013.01); *B60W 10/08* (2013.01); *B60W 10/18* (2013.01); *B60W 30/18009* (2013.01); *E02F 9/2095* (2013.01); *E02F 9/226* (2013.01); *B60L 2200/36* (2013.01); *B60L 2200/40* (2013.01); *B60L 2210/30* (2013.01); *B60L 2210/40* (2013.01); *B60L 2220/12* (2013.01); *B60L 2220/44* (2013.01); *B60L 2220/46* (2013.01); *B60L 2240/12* (2013.01); *B60L 2240/16* (2013.01); *B60L 2240/32* (2013.01); *B60L 2240/421* (2013.01); *B60L 2240/423* (2013.01); *B60L 2240/429* (2013.01); *B60L 2240/441* (2013.01); *B60L 2240/443* (2013.01); *B60L 2240/642* (2013.01); *B60L 2250/16* (2013.01); *B60L 2250/24* (2013.01); *B60L 2250/26* (2013.01); *B60T 7/122* (2013.01); *B60T 2201/06* (2013.01); *B60W 40/107* (2013.01); *B60W 2520/105* (2013.01); *B60W 2530/10* (2013.01); *B60W 2540/10* (2013.01); *B60W 2550/142* (2013.01); *B60W 2710/083* (2013.01); *B60W 2710/18* (2013.01); *B60W 2720/106* (2013.01); *E02F 9/2075* (2013.01); *E02F 9/2083* (2013.01); *Y02T 10/6217* (2013.01); *Y02T 10/645* (2013.01); *Y02T 10/7005* (2013.01); *Y02T 10/705* (2013.01); *Y02T 10/7022* (2013.01); *Y02T 10/7044* (2013.01); *Y02T 10/7077* (2013.01); *Y02T 10/7241* (2013.01); *Y02T 10/7275* (2013.01); *Y02T 10/7291* (2013.01); *Y02T 90/16* (2013.01); *Y10S 903/902* (2013.01)

(58) Field of Classification Search
CPC ....... B60W 2520/105; B60W 2540/10; B60W 2550/142; B60W 2710/083; B60W 2710/18; B60W 2720/106; B60W 40/107; Y02T 10/7077; Y02T 10/7044; Y02T 10/7005; Y02T 10/705; Y02T 10/7241; Y02T 10/7022; Y02T 90/16; Y02T 10/645; Y02T 10/7275; Y02T 10/6217; Y02T 10/7291; E02F 9/2075; E02F 9/2083; E02F 9/2095; E02F 9/226; B60L 2200/36; B60L 2200/40; B60L 2210/30; B60L 2210/40; B60L 2220/12; B60L 2220/44; B60L 2220/46; B60L 2240/32; B60L 2240/421; B60L 2240/429; B60L 2240/642; B60L 2250/16; B60L 2250/24; B60L 2250/26; B60L 15/2018; B60L 15/2063; B60L 15/20; B60L 2240/12; B60L 2240/16; B60L 2240/423; B60L 50/40; B60L 50/13; B60L 50/61; B60L 58/12; B60L 2240/441; B60L 2240/443; B60L 7/12; B60L 7/26; B60L 7/28; B60L 9/22; B60L 15/2009; B60L 15/2081; B60T 2201/06; B60T 13/586; B60T 7/122; Y10S 903/902
See application file for complete search history.

(56) References Cited

U.S. PATENT DOCUMENTS

| | | | |
|---|---|---|---|
| 7,439,695 B2 | 10/2008 | Ngo et al. | |
| 7,853,388 B2 | 12/2010 | Wang | |
| 7,926,889 B2 | 5/2011 | Bell et al. | |
| 9,227,515 B2 | 1/2016 | Wolff et al. | |
| 9,944,288 B1* | 4/2018 | Hu | B60T 8/17 |
| 2002/0120382 A1* | 8/2002 | Hatanaka | B62M 6/45 |
| | | | 701/70 |
| 2003/0085576 A1 | 5/2003 | Kuang et al. | |
| 2004/0012250 A1 | 1/2004 | Tetsuya | |
| 2004/0238244 A1* | 12/2004 | Amanuma | B60K 6/52 |
| | | | 180/65.225 |
| 2006/0231304 A1* | 10/2006 | Severinsky | B60H 1/004 |
| | | | 180/65.23 |
| 2009/0127012 A1 | 5/2009 | Leibbrandt et al. | |
| 2009/0145673 A1* | 6/2009 | Soliman | B60W 20/13 |
| | | | 180/65.1 |
| 2010/0025167 A1 | 2/2010 | Staub et al. | |
| 2012/0072065 A1* | 3/2012 | Minamikawa | B60K 6/445 |
| | | | 701/22 |
| 2012/0187750 A1 | 7/2012 | Kish et al. | |
| 2013/0060433 A1* | 3/2013 | Maruyama | B60T 7/122 |
| | | | 701/53 |
| 2013/0096797 A1* | 4/2013 | Whitney | B60K 6/445 |
| | | | 701/87 |
| 2014/0163823 A1* | 6/2014 | Kim | B60W 10/06 |
| | | | 701/43 |
| 2014/0249729 A1 | 9/2014 | Schwartz et al. | |

(56) References Cited

U.S. PATENT DOCUMENTS

| | | | |
|---|---|---|---|
| 2015/0081150 A1* | 3/2015 | Wolff | B60L 50/61 701/22 |
| 2016/0101700 A1 | 4/2016 | Brown et al. | |
| 2016/0101766 A1 | 4/2016 | Hu et al. | |
| 2018/0065629 A1* | 3/2018 | Wolff | B60L 58/12 |

FOREIGN PATENT DOCUMENTS

| | | | |
|---|---|---|---|
| GB | 2454270 A | 5/2009 | |
| GB | 2454270 B | 5/2009 | |
| JP | 2000197203 A | 7/2000 | |
| JP | 2004042890 A | 2/2004 | |
| JP | 2008296806 A | 12/2008 | |
| JP | 2012092871 A | 5/2012 | |
| WO | 2013/024491 A2 | 2/2013 | |

OTHER PUBLICATIONS

Brown, T., et al., Control system and method for a vehicle, GE co-pending U.S. Appl. No. 61/925,733, filed Jan. 10, 2014.

Fischer, R., et al., System and method for controlling a vehicle, GE co-pending U.S. Appl. No. 62/415,589, filed Nov. 1, 2016.

Wolff, J.J., et al., System and method for controlling a vehicle, GE co-pending U.S. Appl. No. 61/867,780, filed Aug. 20, 2013.

International Preliminary Report on Patentability for corresponding PCT Application No. PCT/US2017/059440 dated May 16, 2019 (18 pages).

European Office Action for corresponding EP Application No. 15 735 572.5-1205 dated Mar. 20, 2019 (6 pages).

Chinese Office Action for corresponding CN Application No. 201580004152.1 dated Mar. 11, 2019 (26 pages).

Japanese Office Action for corresponding JP Application No. 2016-544655 dated Jan. 31, 2019 (10 pages).

EPO Office Action issued for corresponding EP Application No. 15735572.8 dated Mar. 20, 2019 (6 pages).

JP Office Action issued for corresponding JP Application No. 201580004152.1 dated Mar. 11, 2019 (11 pages).

English translated JP Office Action issued for corresponding JP Application No. 201580004152.1 dated Mar. 11, 2019 (15 pages).

* cited by examiner

SYSTEM AND METHOD FOR CONTROLLING A VEHICLE

CROSS-REFERENCE TO RELATED APPLICATIONS

This application claims priority to U.S. Provisional Application No. 62/480,590, which was filed on 3 Apr. 2017. This application also claims priority to U.S. Provisional Application No. 62/415,589, which was filed on 1 Nov. 2016.

This application also is a continuation-in-part of U.S. patent application Ser. No. 14/974,430, which was filed on 18 Dec. 2015 (the "'430 Application"). The '430 application is continuation of International Application PCT/US2015/010756, filed 9 Jan. 2015, which claims priority to U.S. Provisional Application No. 61/925,733, filed 10 Jan. 2014. The '430 application also is a continuation-in-part of U.S. application Ser. No. 14/464,226, filed 20 Aug. 2014, which claims priority to U.S. Provisional Application No. 61/867,780 filed 20 Aug. 2013.

All the aforementioned applications are incorporated by reference herein in their entireties.

FIELD

Embodiments of the inventive subject matter described herein relate to vehicle control. Other embodiments relate to controlling a vehicle to prevent rollback.

BACKGROUND

Vehicles, such as off-highway mining vehicles "OHVs" and load-haul-dump vehicles "LHDs" used to mine and haul heavy payloads from underground mines, are well known. LHDs and other vehicles are commonly available in both diesel and electric versions and often employ motorized wheels for propelling or retarding the vehicle in an energy efficient manner. This efficiency is typically accomplished by employing a large horsepower diesel engine in conjunction with an alternator, a main traction inverter, and wheel drive assemblies housed within the tires of the vehicle. The diesel engine is directly associated with the alternator such that the diesel engine drives the alternator. The alternator powers the main traction inverter, which supplies electrical power having a controlled voltage and frequency to electric drive motors of the wheel drive assemblies. Each wheel drive assembly houses a planetary gear transmission that converts the rotation of the associated drive motor energy into a high torque low speed rotational energy output which is supplied to the wheels.

In addition to powering the main traction inverter, and thus the electric drive motors for propelling the vehicle, the alternator also powers hydraulic pumps and hydraulic motors used by various auxiliary vehicle systems, such as for bucket movement and for application of service and parking brakes.

Due to the weight of such vehicles, the payloads carried, and the environment within which such vehicles are utilized, operating these vehicles on grade can present several challenges, especially for inexperienced operators. Accordingly, it may be desirable to provide a system and method for controlling a vehicle that differ from existing systems and methods.

BRIEF DESCRIPTION

In an embodiment, a method for controlling a vehicle is provided. The method includes the steps of, while traveling on grade in a selected direction of travel, controlling at least one traction motor of the vehicle to provide a controlled deceleration of the vehicle, and automatically applying a service brake of the vehicle while the vehicle is moving in the selected direction of travel.

In another embodiment, a system is provided. The system includes a control unit configured to be electrically coupled to a drive system of a vehicle, the drive system including at least one traction motor for providing motive power to the vehicle, and a service brake associated with at least one wheel of the vehicle. In the absence of a command to provide the motive power in the selected direction of travel, the control unit is configured to automatically apply the service brake while the vehicle is moving in a selected direction of travel to prevent rollback of the vehicle.

In an embodiment, a method for controlling a vehicle is provided. The method includes the steps of determining a selected direction of travel of the vehicle, monitoring a direction of operation of a motor of the vehicle, monitoring a speed of the motor, and automatically applying a service brake of the vehicle when a rollback condition is detected to prevent rollback of the vehicle.

In another embodiment, a system is provided. The system includes a control unit configured to be electrically coupled to a drive system of a vehicle, the drive system including at least one traction motor for providing motive power to the vehicle, and a service brake associated with at least one wheel of the vehicle. The control unit is configured to automatically apply the service brake when a rollback condition is detected to prevent rollback of the vehicle.

In yet another embodiment, a vehicle is provided. The vehicle includes a drive system including a traction motor connected in driving relationship to a wheel of the vehicle, the motor being configured to provide motive power to propel the vehicle in a selected direction of travel in a propel mode of operation, a controller electrically coupled to the drive system, and a friction brake associated with at least one wheel of the vehicle. The controller is configured to automatically engage the friction brake when a rollback condition is detected to prevent rollback of the vehicle.

In an embodiment, a control system (e.g., braking control system) for a vehicle comprises an electric drive system associated with at least a first set of wheels of the vehicle and a drive system control unit configured to control the electric drive system to selectively provide electric motive power to the at least the first set of wheels to propel the vehicle and electric retarding to slow the vehicle. The system further comprises a friction brake system associated with at least one of the first set of wheels or a second set of wheels of the vehicle, and a friction brake control unit configured to control the friction brake system for a friction brake application to the at least one of the first set of wheels or the second set of wheels. The drive system control unit is further configured to communicate with the friction brake control unit to control an amount of the friction brake application during vehicle stops and starts. For example, the drive system control unit may be configured to communicate with the friction brake control unit to at least partially automatically control the amount of the friction brake application during vehicle stops and starts on an inclined grade on which the vehicle is positioned.

In another embodiment, a method of controlling vehicle comprises, at a drive system control unit of the vehicle, controlling an electric drive system associated with at least a first set of wheels of the vehicle to selectively provide electric motive power to the at least the first set of wheels to propel the vehicle and electric retarding to slow the vehicle.

The method further comprises determining a torque level needed to move the vehicle from stop to up an inclined grade, and, responsive to an input from an operator control for the vehicle to move up the grade, communicating with a friction brake control unit of the vehicle to remove a friction brake application that holds the vehicle stopped and concurrently controlling the electric drive system of the vehicle to provide the electric motive power according to the torque level that is determined, for the vehicle to move from stop to up the inclined grade without substantial vehicle rollback.

In another embodiment, a method of controlling a vehicle comprises, at a drive system control unit of the vehicle, controlling an electric drive system associated with at least a first set of wheels of the vehicle to selectively provide electric motive power to the at least the first set of wheels to propel the vehicle and electric retarding to slow the vehicle. The method further comprises determining a force needed to hold the vehicle on an inclined grade on which the vehicle is positioned, and communicating with a friction brake control unit of the vehicle to decrease or increase an amount of friction brake application applied to at least one of the first set of wheels or a second set of wheels of the vehicle, in dependence upon the force that is determined to hold the vehicle on the inclined grade.

In one embodiment, a vehicle control system includes a controller configured to determine an upper non-zero limit on deceleration of a vehicle. The controller is configured to determine the upper non-zero limit to prevent rollback of the vehicle down a grade being traveled up on by the vehicle. The upper non-zero limit on deceleration is determined by the controller based on a payload carried by the vehicle, a speed of the vehicle, and a grade of a route being traveled upon by the vehicle. The controller is configured to monitor the deceleration of the vehicle, and to automatically prevent the deceleration of the vehicle from exceeding the upper non-zero limit by controlling one or more of a brake or a motor of the vehicle. The controller also is configured to one or more of actuate the brake or supply current to the motor of the vehicle to prevent rollback of the vehicle while the vehicle is moving up the grade at a non-zero speed.

In one embodiment, a method includes determining an upper non-zero limit on deceleration of a vehicle to prevent rollback of the vehicle down a grade being traveled up on by the vehicle. The upper non-zero limit on deceleration is determined based on a payload carried by the vehicle, a speed of the vehicle, and a grade of a route being traveled upon by the vehicle. The method also includes monitoring the deceleration of the vehicle and automatically preventing the deceleration of the vehicle from exceeding the upper non-zero limit by controlling one or more of a brake or a motor of the vehicle. Deceleration of the vehicle is prevented from exceeding the upper non-zero limit by one or more actuating the brake or supplying current to the motor of the vehicle to prevent rollback of the vehicle while the vehicle is moving up the grade at a non-zero speed.

In one embodiment, a vehicle control system includes a controller configured to determine a selected direction of travel of a vehicle, an operational direction of a motor of the vehicle, and an operational speed of the motor. The controller is configured to identify a rollback condition of the vehicle responsive to the operational direction of the motor of the vehicle being different from the selected direction of travel of the vehicle. The controller also is configured to automatically slow or stop movement of the vehicle by automatically actuating a brake of the vehicle responsive to the rollback condition being identified and the operational speed of the motor exceeding a designated, non-zero speed threshold.

In one embodiment, a vehicle control system includes a controller configured to determine a lower limit on speed of a vehicle. The controller is configured to determine the lower limit to prevent rollback of the vehicle down a grade being traveled up on by the vehicle. The lower limit is determined by the controller based on a payload carried by the vehicle and a grade of a route being traveled upon by the vehicle. The controller is configured to monitor the speed of the vehicle and to automatically prevent the speed of the vehicle from falling below the lower limit by actuating a brake of the vehicle. The controller is configured to actuate the brake based on the speed of the vehicle and independent of acceleration of the vehicle. The controller also is configured to actuate the brake of the vehicle to prevent rollback of the vehicle while the vehicle is moving up the grade at a non-zero speed.

In one embodiment, a method includes receiving a throttle command representative of an operator-requested increase in a throttle setting of a vehicle while a brake of the vehicle is engaged, increasing a torque generated by one or more motors of the vehicle responsive to receiving the throttle command, and releasing the brake of the vehicle responsive to one or more of the torque generated by the one or more motors reaching a maximum available torque, the torque generated by the one or more motors reaching a target release acceleration, or expiration of a predetermined non-zero duration of time.

In one embodiment, a method includes determining whether a brake of a vehicle is released while the vehicle is in a stopped state on a grade of a route, responsive to determining that the brake is released, one or more of allowing the vehicle to roll back down the grade by no more than a designated, non-zero threshold distance or rapidly accelerating the vehicle using torque generated by one or more motors of the vehicle, and smoothly transitioning movement of the vehicle up the grade by adjusting the torque generated by the one or more motors subsequent to the one or more of allowing the vehicle to roll down the grade or rapidly accelerating the vehicle.

In one embodiment, a method includes (while one or more brakes of a vehicle in a stationary position on a grade are engaged) repeatedly determining whether an operator input to release the one or more brakes is received during a blanking interval, releasing the one or more brakes of the vehicle responsive to not receiving the operator input to release the one or more brakes during the blanking interval, and automatically generating torque with one or more motors of the vehicle to propel the vehicle up the grade.

BRIEF DESCRIPTION OF THE DRAWINGS

Reference is now made briefly to the accompanying drawings, in which.

DETAILED DESCRIPTION

Figure 1:
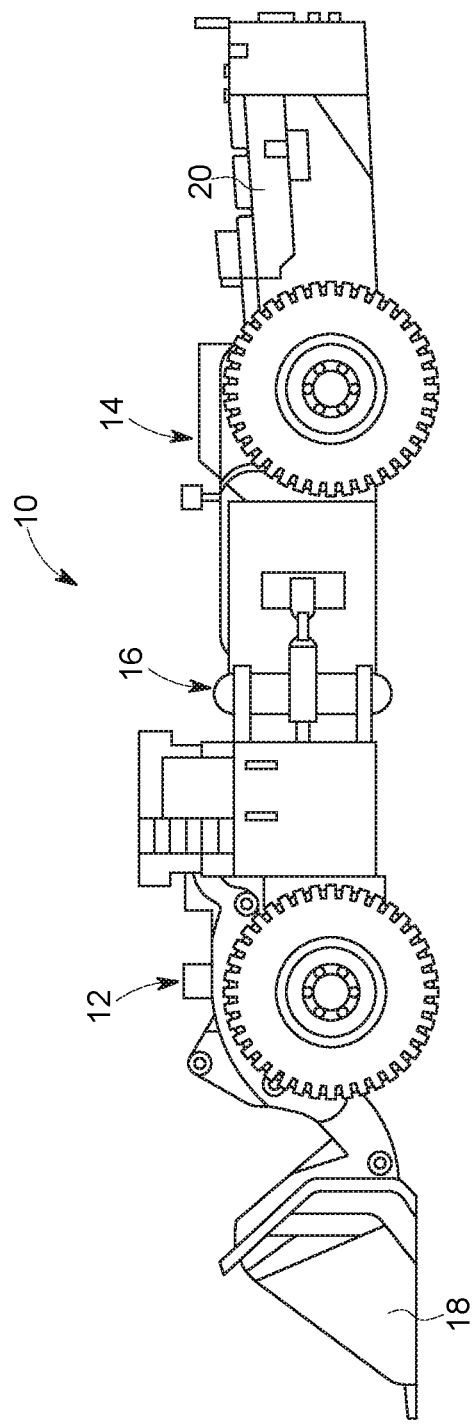
FIG. 1 is a side elevation view of a load-haul-dump vehicle outfitted with a system for preventing vehicle rollback, according to an embodiment of the inventive subject matter.

Reference will be made below in detail to example embodiments of the inventive subject matter, examples of which are illustrated in the accompanying drawings. Wherever possible, the same reference numerals used throughout the drawings refer to the same or like parts. Although example embodiments of the inventive subject matter are described with respect to load-haul-dump vehicles having a diesel engine that are utilized in the underground mining industry, embodiments of the inventive subject matter are also applicable for use with internal combustion engines and vehicles employing such engines, generally. For example, the vehicles may be off-highway vehicles designed to perform an operation associated with a particular industry, such as mining, construction, farming, etc., and may include haul trucks, cranes, earth moving machines, mining machines, farming equipment, tractors, material handling equipment, earth moving equipment, etc. Alternatively or additionally, the vehicles may be on-road vehicles, such as tractor-trailer rigs, on-road dump trucks, etc. Moreover, yet other embodiments of the inventive subject matter are applicable to purely electric vehicles and machinery, such as battery powered vehicles. As used herein, "electrical communication" or "electrically coupled" means that certain components are configured to communicate with one another through direct or indirect signaling by way of direct or indirect electrical connections. As also used herein, "zero speed" refers to a condition of a vehicle when it is stopped/static. "Near zero" speed means very-nearly stopped (e.g., in an embodiment, traveling no more than 5 mph/8 kph, or in another embodiment, traveling no more than 1 mph/1.6 kph).

Embodiments of the inventive subject matter relate to control systems (and related methods) for controlling a vehicle, which prevent the vehicle from rolling backwards on grade. "Grade" refers to a non-flat surface having an incline of greater or less than zero degrees. "Service brake" refers to a mechanical friction brake, e.g., typically of the type where a brake pad is actuated with an air/pneumatic or hydraulic system to engage a rotor or disc that is connected to a wheel or axle, and which is typically separate from the propulsion system.)

FIG. 1 illustrates a load-haul-dump vehicle 10, in which a control system of the inventive subject matter may be incorporated. The LHD vehicle includes a front chassis 12 connected to a rear chassis 14 through an articulated joint 16. The vehicle 10 also includes a bucket 18 at the front thereof for engaging an overburden pile and/or for moving overburden and/or mined material. The bucket 118 is operable via a hydraulic lift assembly (not shown). A rear of the vehicle 100 is provided with a compartment 20 within which a diesel engine (in the case of diesel engine driven vehicle) or batteries (in the case of an electrically driven vehicle) for providing motive power to the vehicle 10 and its accessories are housed.

Figure 2:
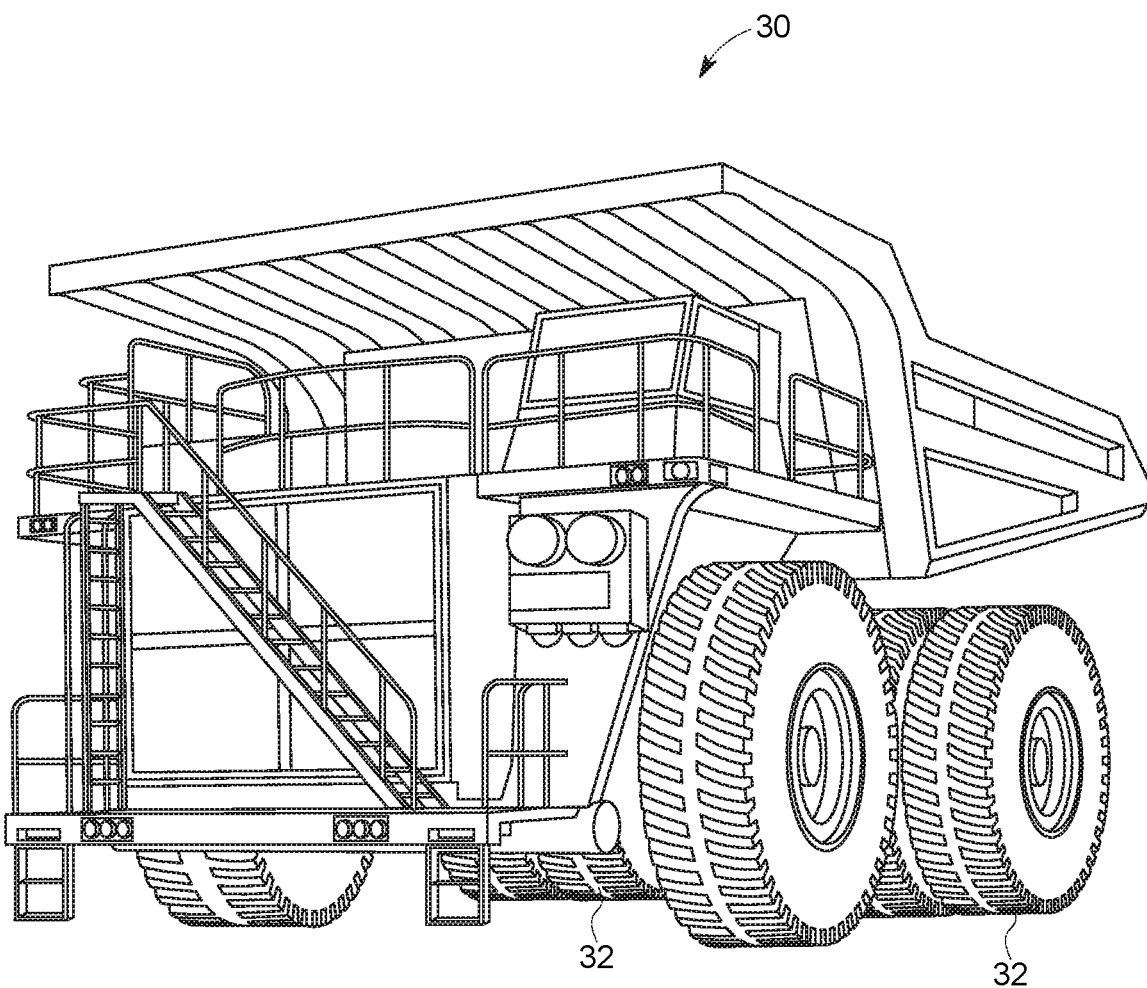
FIG. 2 is a perspective view of another vehicle outfitted with a system for preventing vehicle rollback, according to an embodiment of the inventive subject matter.

With reference to FIG. 2, the vehicle may be a haul truck 30. The haul truck 30 is a dump truck specifically engineered for use in high production mining and heavy-duty construction environments. The drive system of the haul truck includes drive wheels 32 coupled to a diesel-electric power/traction system which provides motive power to the haul truck. (The haul truck and underground mining vehicles are illustrative of vehicles generally, although in embodiments, a system and/or method of the inventive subject matter is implemented on a haul truck or an underground mining vehicle specifically.)

Figure 3:
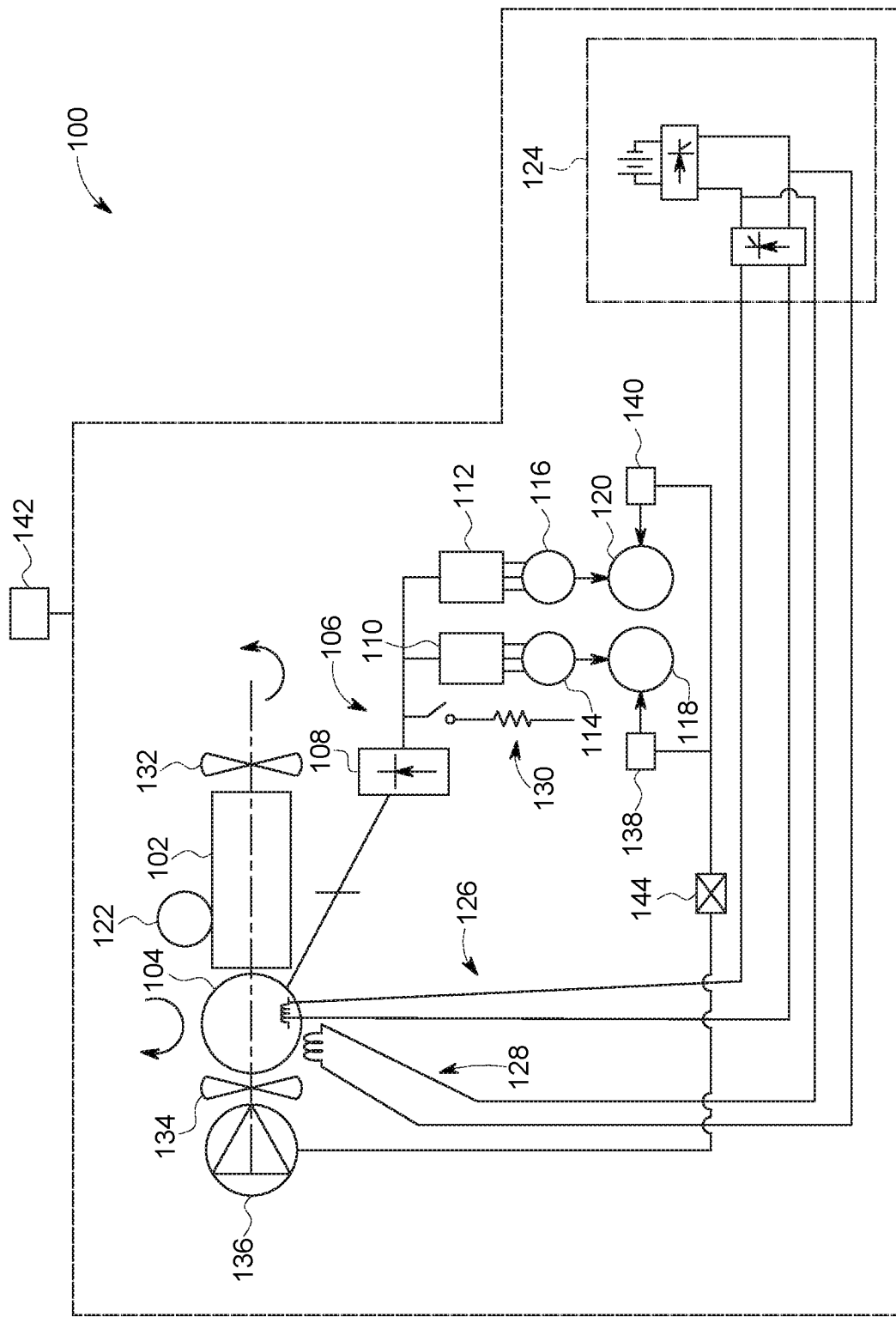
FIG. 3 is a schematic diagram of a drive system and system for preventing vehicle rollback, according to an embodiment of the inventive subject matter.

FIG. 3 schematically illustrates an example of a drive system 100 for an electric drive machine such as LHD vehicle 10 or haul truck 30. The drive system 100 includes a primary power source such as an engine 102 (e.g., a diesel engine, a gasoline engine, a multi-fuel engine, etc.) and a traction alternator/generator 104 mechanically coupled to and driven by the engine 102. As illustrated in FIG. 3, the traction alternator 104 is electrically coupled to a traction bus 106. The alternator 104 is configured to provide AC electric power to one or more rectifiers 108, which are electrically connected to one or more power converters, e.g., first and second inverters 110, 112, via the traction bus 106. The inverters 110, 112 are connected to one or more motors, such as first and second traction motors 114, 116 associated with first and second wheels of the vehicle, e.g., rear wheels 12 (including first rear wheel 118 and second rear wheel 120) of vehicle 10, respectively. Optionally, the vehicle may have a single motor or more than two motors. While two inverters and two motors are shown in FIG. 3, one or more embodiments of the inventive subject matter described herein may be used in connection with a single inverter and a single motor, or more than two inverters and more than two motors in a vehicle. The rectifier 108 is configured to convert the AC power received from the alternator 104 into a DC output which is then fed to the inverters 110, 112 through the traction bus 106. The inverters 110, 112 are configured to supply three-phase, variable frequency AC power to the first and second traction motors 114, 116 associated with the first and second wheels 118, 120 of the vehicle 10 (typically the rear wheels of the vehicle).

As also shown in FIG. 3, in an embodiment, a starter motor 122 may be associated with the engine 102 for rotating the engine 102 so as to initiate operation, as is known in the art. In addition, the vehicle may include a battery 124, e.g. a 24V battery, electrically coupled to the alternator 104 through a tertiary winding 126 and a field winding 128. The battery 124 is configured to function as an alternator field static exciter to initiate operation of the electric drive system 100 of the vehicle 10.

The traction motors 114, 116 provide the tractive power to move the vehicle, and may be AC or DC electric motors. When using DC traction motors, the output of the alternator is typically rectified to provide appropriate DC power. When using AC traction motors, the alternator output is typically rectified to DC and thereafter inverted to three-phase AC before being supplied to the traction motors 114, 116. During a propel mode of operation, power may be transferred from the engine 102 to the traction motors 114, 116, and thus to the wheels 118, 120 of the vehicle 10 to effect movement.

In addition to providing motive power, the traction motors 114, 116 may also provide a braking force or braking effort for controlling the speed of the vehicle 10 on which the drive system 100 is deployed. This is commonly referred to as dynamic braking. During a dynamic braking mode of operation, such as when motion of the vehicle is to be retarded, power may be generated by the mechanical rotation of the drive wheels and directed toward a retarding grid 130. In particular, the kinetic energy of the vehicle 10 may be converted into rotational power at the drive wheels 118, 120. Rotation of the drive wheels may further rotate the motors 114, 116 so as to generate electrical power, for example, in the form of AC power. The inverters 110, 112 may serve as a bridge to convert the power supplied by the motors 114, 116 into DC power. Dissipation of the DC power generated by the motors 114, 116 may produce a counter-rotational torque at the drive wheels 118, 120 to decelerate the vehicle 10. Such dissipation may be accomplished by passing the generated current provided by the inverters 110, 112 through a resistance, such as the dynamic braking grid 130, or retarding grid, as shown.

As further illustrated in FIG. 3, the drive system 100 also includes an engine radiator fan 132 driven by the engine 102 to provide cooling for the engine 102. The system 100 may also include one or more control and motor cooling fans 134 mechanically coupled to the alternator 104. The cooling fan(s) 134 is configured to provide cooling for all components of the traction drive system, such as the inverters 110, 112, traction motors 114, 116 and the like.

The alternator 104 may also be coupled to a hydraulic pump 136 which provides hydraulic pressure for use by accessories or other components of the vehicle. For example, the hydraulic pump 136 may be configured to provide hydraulic pressure for use by the bucket arm 18 and/or braking devices, such as one or more hydraulic service brakes 138, 140 associated with one or more wheels of the vehicle 10 (e.g., depicted in FIG. 3 as being associated with wheels 118, 120). While two brakes are shown in FIG. 3, optionally, the vehicle can include a single brake or more than two brakes. The hydraulic service brakes 138, 140 are operable to provide a frictional braking force or braking effort for the wheels 118, 120 of the vehicle 10 to stop or slow the vehicle, and may be utilized to supplement, or in place of, the braking effort provided by the traction motors 114, 116 when operating in the dynamic braking mode of operation. In an embodiment, the hydraulic service brakes 138, 140 are fluidly coupled to hydraulic pump 136 and include one or more electro-hydraulic proportional valves 144, the position of which may be controlled by a controller, as discussed hereinafter, to control an amount of braking effort provided by the brakes 138, 140. Other types of valves may also be utilized.

While the vehicle 10 described herein is disclosed as including braking devices in the form of hydraulic service brakes, other types of service brakes may also be utilized on-board the vehicle without departing from the broader aspects of the inventive subject matter. For example, the service brakes may be any type of frictional brake known in the art that utilize a wear surface that contacts (e.g., by clamping or pressing against) a rotating or moving component of a wheel of the vehicle to slow or stop the rotation of the wheel by friction to slow or stop the vehicle. Forcing of the wear surface of the frictional brake against a portion of the wheel (e.g., a disc, drum, etc.) may be accomplished mechanically, hydraulically, pneumatically or electromagnetically. As used herein, "service brakes" may encompass vehicle parking brakes and/or wheel brake locks. Optionally, the brake that is applied may be one or more traction motors that are engaged to not rotate in a rearward direction (e.g., relative to a selected or previous direction of travel).

Regardless of the particular type of service brake utilized, the braking devices 138, 140 may be manually deployed or actuated by an operator of the vehicle such as, for example, by depressing a brake pedal within an operator cab or by pressing a button on a user interface, although other means of initiating the frictional contact of the brake with a rotating wheel component may also be utilized. In an embodiment, application of the service brakes 138, 140 may also be controlled automatically by a controller or control unit of the vehicle. In particular, as further illustrated in FIG. 3, the drive system 100 and various components thereof, including the braking devices 138, 140 may be electrically coupled (or otherwise in communication with) and controlled by a controller 142. The controller 142 can represent hardware circuitry that includes and/or is connected with one or more processors (e.g., one or more microprocessors, field programmable gate arrays, and/or integrated circuits). In particular, the controller 142 is configured to control the traction motor system 100 and the various components thereof, and the electricity supplied to and from the traction motor system.

As discussed hereinafter, the controller 142 is also operable to automatically prevent vehicle rollback when on grade through the coordinated control of the service brakes 138, 140 and the drive system 100. In particular, the control unit or controller 142 is configured to automatically apply the service brakes 138, 140 and/or control the torque output of the wheel motors 114, 116 to hold the vehicle 10 at zero speed or near zero speed on grade during various operating conditions, without input from an operator of the vehicle, in order to prevent inadvertent rollback. As used herein, "automatically" means without input or intervention from an operator of the vehicle. As used herein, "rollback condition" means a state or condition where vehicle movement in a direction opposite or different from a selected or desired direction of travel is possible in the absence of braking or depression of the accelerator pedal of the vehicle.

For example, a rollback condition is possible when a vehicle is traveling on grade and an operator desires to bring the vehicle a stop. As the operator or control system releases an acceleration input device of the vehicle, such as the accelerator pedal (or otherwise manually or automatically ceases acceleration in a direction of travel), the vehicle will quickly decelerate due to the grade on which the vehicle is traveling, and the vehicle will approach zero speed. Additionally, the vehicle may decelerate even if the operator continues to actuate the acceleration input device (e.g., depress a pedal) due to the grade in the route. As the zero-speed threshold is reached, the vehicle can roll backward in the absence of application of the service brakes or parking brakes. To prevent this backward movement, one or more brakes may be automatically actuated and/or one or more motors may be automatically operated to generate torque in an opposite direction. This results in the vehicle maintaining a position on the route (e.g., not rolling backward) or the vehicle slightly moving backward at a controlled speed.

The vehicle movement in one or more directions can be determined using one or more sensors 300. These sensors 300 can include a global positioning system receiver, a reflective sensor, an interrupter sensor, an optical encoder, a variable-reluctance sensor, a Wiegand sensor, a Hall-effect sensor, or the like. The controller 142 can determine the direction of travel of the vehicle 10 based on output from the sensors 300.

Figure 4:
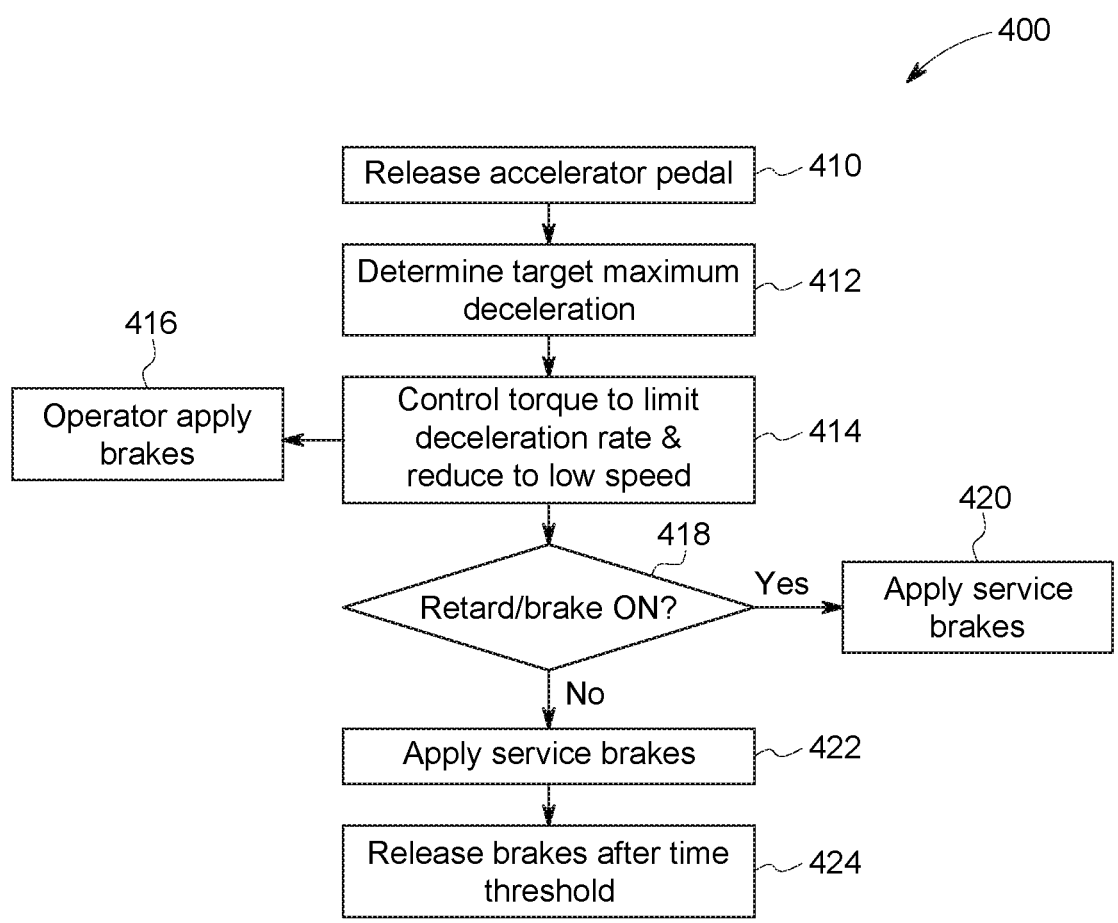
FIG. 4 is a diagram illustrating a control routine for preventing vehicle rollback, according to an embodiment of the inventive subject matter.

FIG. 4 illustrates a flowchart of one embodiment of a method 400 for preventing vehicle rollback. The flowchart can represent operations performed under the direction of a control routine performed by the controller 142 for preventing vehicle rollback when an operator desires to bring a vehicle to stop on grade. As shown therein, when the operator releases the accelerator pedal at 410, the controller 142 is configured to determine a target maximum deceleration based upon payload, vehicle speed and/or estimated grade at 412, and to control torque as needed to maintain vehicle deceleration to less than the maximum deceleration rate and to slow the vehicle, at 414.

The payload weight can be determined based on input provided to the controller 142 from an operator, a manifest, a sensor (e.g., a scale on which the payload is located), or the like. The vehicle speed can be determined by one or more of the sensors 300, such as a global positioning system receiver, a tachometer, or the like. The estimated grade can be determined from input provided by an operator or by reference to a database containing grades of the route at different locations. Optionally, one or more of the sensors 300 can include an inclinometer, accelerometer, or the like, that can output data indicative of the grade or estimated grade of a route. The target maximum deceleration (or upper deceleration limit) can decrease for heavier payloads (or increase for lighter payloads), can decrease for slower vehicle speeds (or increase for faster vehicle speeds) in a direction that is opposite of a selected or previous direction of travel, and/or can decrease for lesser grades (e.g., grades that are flatter) or increase for steeper grades (e.g., grades that are more inclined).

The drive system 100 is utilized to provide a controlled descent/slowing of the vehicle (rather than just letting gravity take over). For example, the torque generated by motor(s) of the drive system 100 can be controlled (e.g., automatically) to achieve a target deceleration of the vehicle and reduce the speed of the vehicle to a very low, but non-zero, speed. The vehicle and motor(s) of the vehicle may continue to operate in the selected direction of travel. That is, the vehicle may not begin rolling backward down the grade or stopping movement to zero speed. As shown at 416, in an embodiment, the operator can then manually apply the service brakes 138, 140 at zero speed or at a very low, near zero (but positive) speed. This can allow for the drive system 100 to prevent rollback of the vehicle without applying any brake of the vehicle. For example, backward movement of the vehicle down the grade can be prevented by applying a torque via the motor(s) of the vehicle that does not propel the vehicle in a selected direction of travel (e.g., up the grade), but that also prevents the vehicle from rolling back down the grade.

As further shown in FIG. 4, in an embodiment, the controller 142 may be configured to automatically apply the service brakes 138, 140 as the vehicle approaches zero speed under controlled deceleration, but while the vehicle is still moving in a selected/desired direction of travel. In particular, the controller 142 determines, at 418, whether or not a brake pedal input/retard command is present (such as input by an operator) or if the accelerator pedal feedback exceeds a threshold. If retard/brake is ON or accelerator pedal feedback exceeds a threshold, and vehicle speed is less than a threshold speed (i.e., as the vehicle approaches zero speed), then the controller 142 applies the service brakes 138, 140 regardless of controlled deceleration or abnormal zero torque deceleration, at 420. If, however, no accelerator pedal or brake feedback is received/detected, and the vehicle speed is less than a threshold speed (i.e., as the vehicle approaches zero speed), then the controller 142 automatically applies the service brakes 138, 140 at a learned speed threshold at zero speed or near zero (but positive speed) based on brake delay time (i.e., the time it takes the brakes to engage and slow/stop the vehicle) and vehicle deceleration, at 422.

Further, if no accelerator pedal or brake input (e.g., manual engagement of the brakes by an operator) is received after a predetermined time has elapsed, then the brakes 138, 140 are then released, at 424. In either embodiment, the brakes may be automatically applied at a learned speed threshold at zero speed or near zero (but positive speed) based on brake delay time (i.e., the time it takes the brakes to engage and slow/stop the vehicle) and vehicle deceleration. For example, the controller 142 may be configured to apply the brakes earlier when decelerating at a rapid rate, and later when decelerating at a slower rate. The inventive described herein therefor provides a means for preventing vehicle rollback when bringing a vehicle to a stop on grade, and provides for a smooth transition from vehicle movement to stop.

Figure 5:
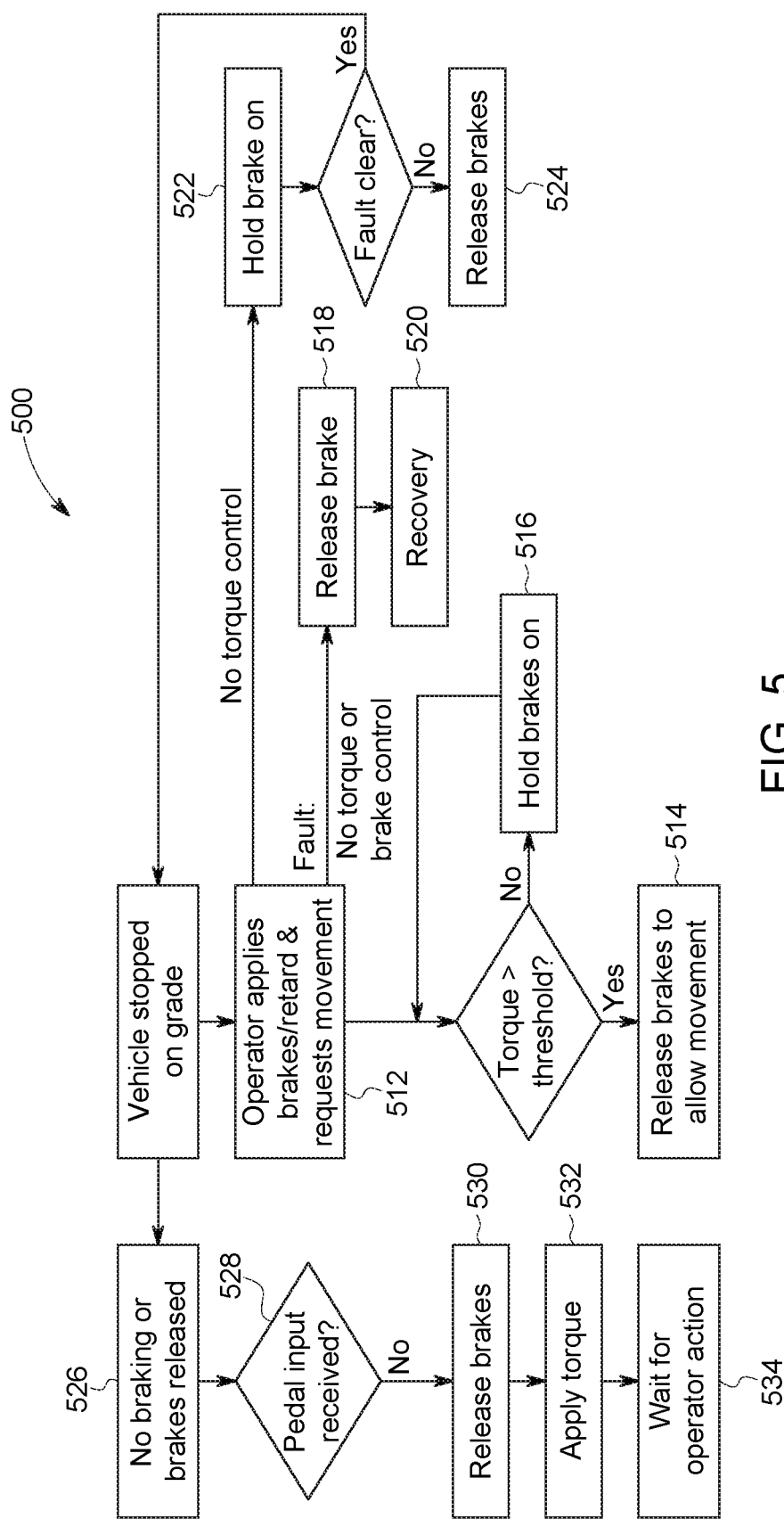
FIG. 5 is a diagram illustrating a control routine for preventing vehicle rollback, according to another embodiment of the inventive subject matter.

Another situation where vehicle rollback can occur is starting a vehicle on grade. When the vehicle is stopped on grade, typically the drive system holds the brake on. The brake may have been applied once the vehicle was stopped, or automatically applied during deceleration, as discussed above. FIG. 5 illustrates a flowchart of one embodiment of a method 500 for preventing vehicle rollback when starting movement on a grade. The flowchart can represent operations performed or carried out by the controller 142 for preventing vehicle rollback when starting a vehicle on grade. As shown at 510, initially, the vehicle is stopped and the drive system holds the vehicle in static position (either through retarding action of the traction motors or through application of the service brakes (e.g., parking brake)). In an embodiment, at 512 an operator applies the brake/retarding effort to maintain vehicle position, and presses the accelerator pedal to ramp up torque to initiate movement. For example, the operator may select a direction of travel (e.g., by providing input into the control system through one or more input devices) and apply the throttle to command vehicle motion. When the torque available at the traction motors exceeds a threshold value sufficient to prevent rollback (i.e., balance torque), the brakes are released at 514 and the vehicle is permitted to move in the selected direction of travel. Otherwise, the brakes are continued to be held on by the controller 142, at 516, until the torque exceeds the threshold. In an embodiment, the torque threshold may be selected in dependence upon the estimated grade.

As further shown in FIG. 5, certain fault conditions may demand other actions to be taken. For example, drive system torque control and drive system brake control may not be enabled or available. If such a fault condition is present, the controller 142 is configured to release the brakes 138, 140 at 518 to prompt operator action. At 520, if the fault condition clears, the controller 142 controls the drive system 100 to respond to the operator/pedal inputs as normal. In another embodiment, drive system brake control may be available and functioning, but drive system torque control may not be. In this case, the controller 142 is configured to hold the brakes 138, 140 on during such fault condition, at 522. If the fault clears, then the control routine proceeds to the initial condition 510. If, however, the fault does not clear after a predetermined time, the controller 142 releases the brakes 138, 140 while the fault is active, at 524, to prompt the operator to take action (e.g., apply service brakes, press override switch, control movement, etc.).

Referring still further to FIG. 5, in an embodiment, the operator may not apply any braking or acceleration input/throttle command or the operator may release the brakes (or remove a commanded retarding effort), at 526. In such case, the controller 142 waits for a predetermined time for a pedal input (e.g., retard/brake/throttle feedback), at 528. If a pedal input is received within the predetermined time period/window, then the control routine proceeds to step 512. If, however, no pedal input is received within the window, the controller 142 controls the drive system 100 to release the brakes 138, 140 and or remove any retarding effort, at 520. In such case, the drive system 100, under control of the controller 142, then applies torque at 532 to allow very slow positive or negative speed, or allows acceleration up to a predetermined speed limit. That is, the drive system 100 is utilized to allow very low speed in the direction of gravity (i.e., limiting rolling speed and prompting the operator to take some action). At 534, the very slow positive or negative speed continues until the operator commands acceleration torque or the operator stops the vehicle utility the brake/retard pedal.

Figure 6:
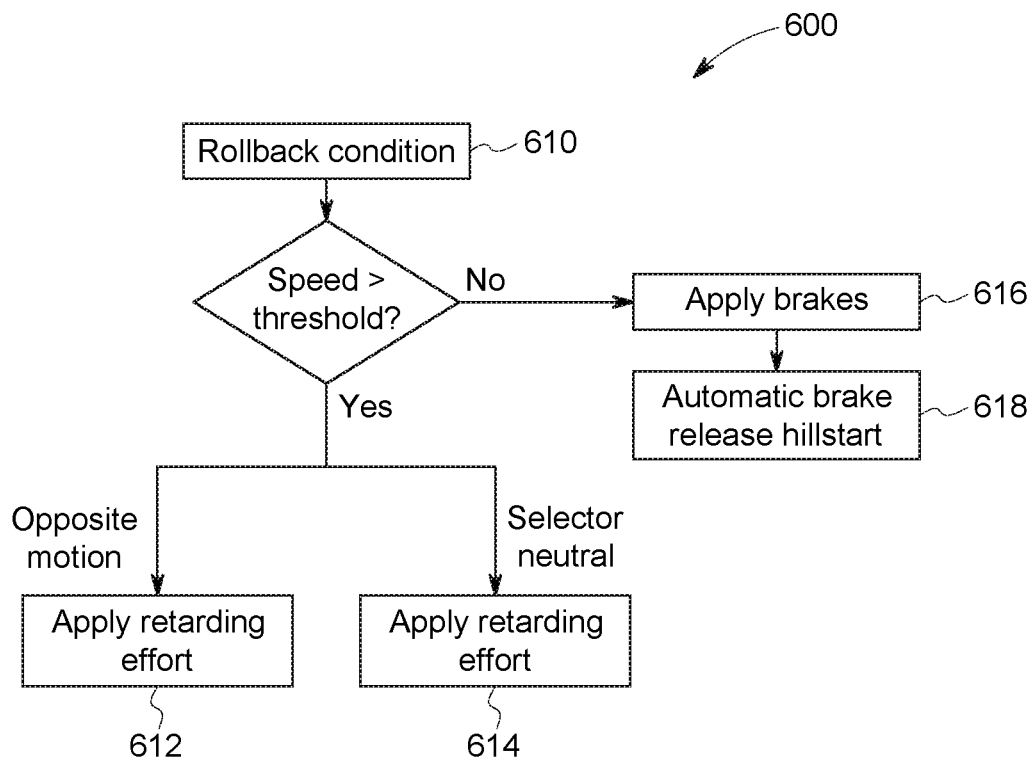
FIG. 6 is diagram illustrating a control routine for preventing vehicle rollback, according to another embodiment of the inventive subject matter.

Turning now to FIG. 6, a flowchart of one embodiment of a method 600 for controlling a vehicle during a rollback condition is illustrated. The flowchart can represent operations performed or carried out by the controller 142 during a rollback condition. The rollback condition may occur, for example, as a result of a drive system fault (e.g., a no propel fault), if the operator changes the selected direction of travel, or if the vehicle decelerates too quickly, crosses zero speed and starts rolling the opposite direction before the brakes can be applied. As shown in FIG. 6, 610 indicates the presence of a rollback condition. In an embodiment, if the speed of the vehicle exceeds a threshold speed stored in memory (i.e., a negative speed indicating rollback) and vehicle movement is detected in a direction opposite the selected direction of travel, the controller 142 is configured to automatically control the traction motors 114, 116 to provide retarding effort to slow the vehicle, as illustrated at 612. The vehicle movement in one or more directions can be determined using one or more of the sensors 300 shown in FIG. 3. In an embodiment, the threshold speed may be approximately 6 mph. In an embodiment, the controller 142 is configured to control the drive system 100 to hold the vehicle speed at approximately 3 mph.

As also shown in FIG. 6, if the speed of the vehicle exceeds a threshold speed stored in memory (i.e., a negative speed indicating rollback) and the selector is in neutral, the controller 142 is configured to automatically control the traction motors 114, 116 to provide retarding effort to slow the vehicle, as illustrated at 614. In an embodiment, the threshold speed may be approximately 5 mph. In an embodiment, the controller 142 is configured to control the drive system 100 to hold the vehicle speed at approximately 3 mph.

In an embodiment, if the speed of the vehicle does not exceed a threshold speed but is still experiencing a rollback condition, the controller 142 may apply the brakes 138, 140 automatically, at 616. This may occur, for example, if the vehicle is brought to a stop under negative speed conditions. Alternatively, the brakes can be automatically applied or otherwise actuated at 616 responsive to the speed of the vehicle not exceeding the threshold speed (also referred to as an upper limit on the speed) without a rollback condition occurring or without a rollback condition being detected. For example, if the vehicle was nearly balanced on a grade and had very low acceleration (e.g., toward zero speed) in the intended or selected direction of travel, the brakes could be applied at some very low speed that does not exceed an upper speed limit (e.g., 30 revolutions per minute of a motor), regardless of whether the acceleration is at or near zero. This can result in the brake(s) being applied without the vehicle rolling back down the grade or without detecting the vehicle rolling back down the grade (e.g., a rollback condition). As shown at 618, the controller 142 may then automatically release the brakes and control the traction motors 114, 116 to provide torque to allow slow speed creep after a set time period. In an embodiment, if the brake is set during the rollback condition, the operator may be required to apply and release the brakes prior to vehicle movement.

Figure 7:
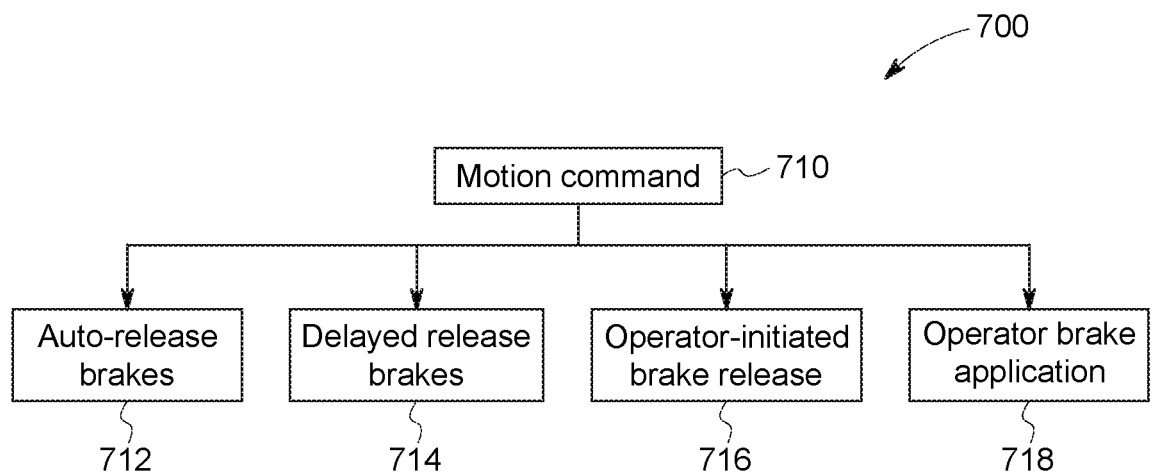
FIG. 7 is diagram illustrating a control routine for preventing vehicle rollback, according to another embodiment of the inventive subject matter.

FIG. 7 illustrates a flowchart of one embodiment of a method 700 for controlling vehicle movement. The flowchart can represent operations performed or carried out by the drive system 100 or the controller 142. In an embodiment, the drive system 100 may be controlled from an initial condition where the vehicle is stopped on grade and the drive system is holding the brakes on. The method 700 begins with a motion command 710 where the operator commands motion by applying at least 50% throttle. In response to the motion command 710, the drive system 100 ramps torque up to a commanded torque or increases to full torque (as opposed to balance torque to merely hold the vehicle stationary on grade). For example, the controller 142 can determine a torque threshold that is the amount of torque needed to achieve a desired acceleration (e.g., based on the operator-selected throttle setting). This torque threshold can be based on the weight of the vehicle, the weight of payload carried by the vehicle, the grade on which the vehicle is stopped, or the like. The drive system 100 can then increase the torque generated by the motor(s) of the vehicle up to the torque indicated by the operator or up to a maximum torque that the motor(s) can generate. In an embodiment, as shown at 712, the controller 142 may control the drive system 100 to provide the maximum amount of torque available, and automatically release the brakes at maximum torque (rather than a threshold torque for a desired velocity). In another embodiment, the controller 142 may hold the brakes on for a predetermined (e.g., non-zero) duration after applying the accelerator pedal, and then release the brakes. In this embodiment, the controller 142 employs a time delay before releasing the brakes. In another embodiment, the controller 142 may prompt an operator to release the brakes, as illustrated at 716. In particular, the controller 142 may indicate to an operator such as through an audio alert or visual display that a threshold torque is available and that the system is ready for the brakes to be released. In yet another embodiment, the operator may take over control of the braking function. For example, at 718 the controller 142 may require the operator to apply the service brakes 138, 140, after which time the brakes may be automatically released when the accelerator pedal is pressed. Balance torque can then be applied to hold zero or slightly positive speed, and torque can be increased as requested by the accelerator pedal.

Figure 13:
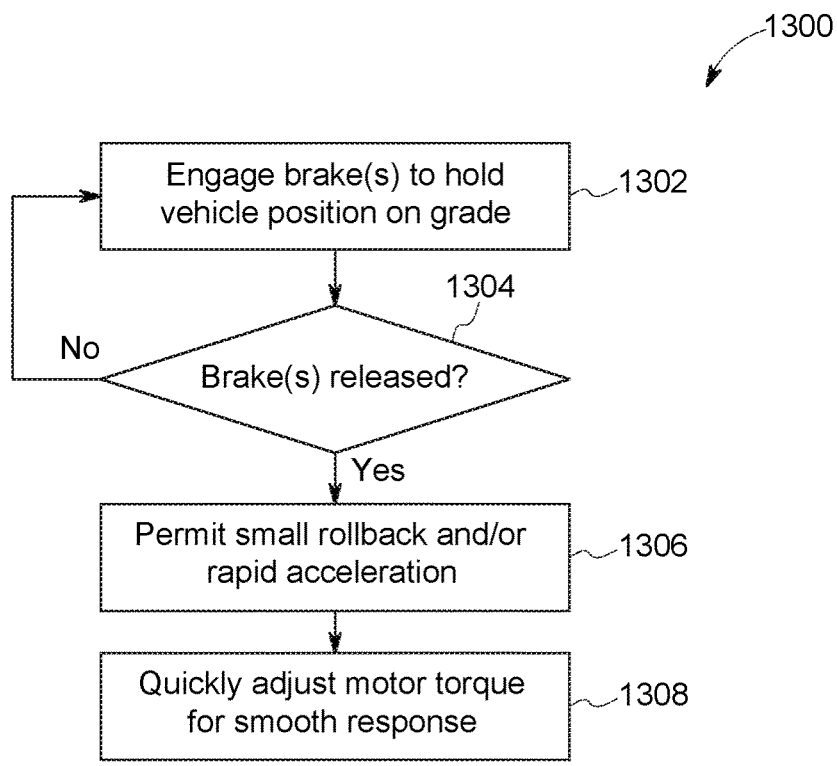
FIG. 13 illustrates a flowchart of one embodiment of a method for controlling vehicle movement from a stopped position on a grade.

FIG. 13 illustrates a flowchart of one embodiment of a method 1300 for controlling vehicle movement from a stopped position on a grade. The operations described in connection with the method 1300 can be performed or implemented by the controller 142 and/or drive system 100. The method 1300 can provide a closed loop process for controlling acceleration of the vehicle following the release of brakes while the vehicle is on a grade. At 1302, one or more brakes of the vehicle are engaged to hold the vehicle in position on a grade. The brake(s) can be engaged according to one or more embodiments of the inventive subject matter described herein, or may be engaged according to another process. At 1304, a determination is made as to whether the brakes are released. For example, the controller 142 can release the brakes responsive to receipt of operator input. If the brakes are released, then flow of the method 1300 can proceed toward 1306. Otherwise, flow of the method 1300 can return toward 1304.

At 1306, the vehicle is permitted to slightly rollback down the grade and/or rapidly accelerate subsequent to and in response to the brakes being released. For example, the controller 142 can allow the drive system 100 to disengage the brakes without generating motor torque or by generating some motor torque to permit the vehicle to roll back down the grade a small amount, such as less than a designated threshold distance of one meter (or another distance) along the length of the route, before directing the motor(s) to generate torque to propel the vehicle up the grade. As another example, the controller 142 can direct the drive system 100 to rapidly accelerate using the motor(s). The controller 142 can direct the drive system 100 to accelerate more rapidly than the drive system 100 would otherwise accelerate (e.g., when not starting movement up a grade from a stopped position) to reach an operator-selected or automatically implemented throttle position. At 1308, the torque generated by the motor(s) of the drive system 100 are quickly adjusted to smoothly transition from the stopped vehicle position to moving according to the operator-selected or automatically implemented throttle position. For example, the rapid acceleration implemented by the drive system 100 may be reduced without jerking or otherwise abruptly moving the vehicle while still moving the vehicle up the grade from the stopped position.

Figure 14:
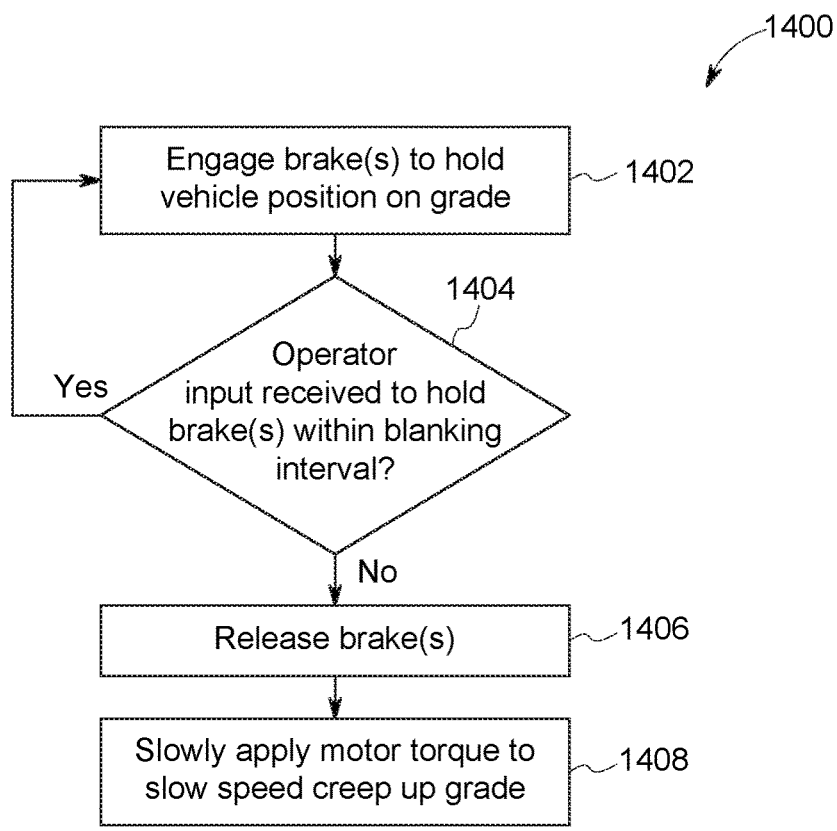
FIG. 14 illustrates a flowchart of one embodiment of a method for automated control of vehicle movement on a grade when no input is provided from an operator of the vehicle.

FIG. 14 illustrates a flowchart of one embodiment of a method 1400 for automated control of vehicle movement on a grade when no input is provided from an operator of the vehicle. The operations described in connection with the method 1400 can be performed or implemented by the controller 142 and/or drive system 100. At 1402, one or more brakes of the vehicle are engaged to hold the vehicle in position on a grade. The brake(s) can be engaged according to one or more embodiments of the inventive subject matter described herein, or may be engaged according to another process. At 1404, a determination is made as to whether an operator of the vehicle has provided input within a designated blanking interval. For example, the controller 142 can determine whether the operator has depressed a brake pedal, actuated a button, or otherwise acted to provide input to the controller 142 to keep the brake(s) engaged. The controller 142 can periodically check for operator input to determine whether the operator has provided the input to keep the brake(s) engaged at least once every blanking interval, such as every five seconds (or other time interval). If the operator has provided input to keep the brake(s) engaged, then flow of the method 1400 can return toward 1402. Otherwise, if the operator has not provided the input within the blanking interval, then flow of the method 1400 can proceed toward 1406.

At 1406, the brake(s) of the vehicle are released. At 1408, motor torque is generated to move the vehicle in a slow creep up the grade. For example, at the same time that the brakes of the vehicle are disengaged (or shortly thereafter), the controller 142 can direct the motor(s) of the drive system 100 to begin generating a small amount of torque to cause the vehicle to move up the grade at a slow speed (e.g., less than five kilometers per hour).

Figure 8:
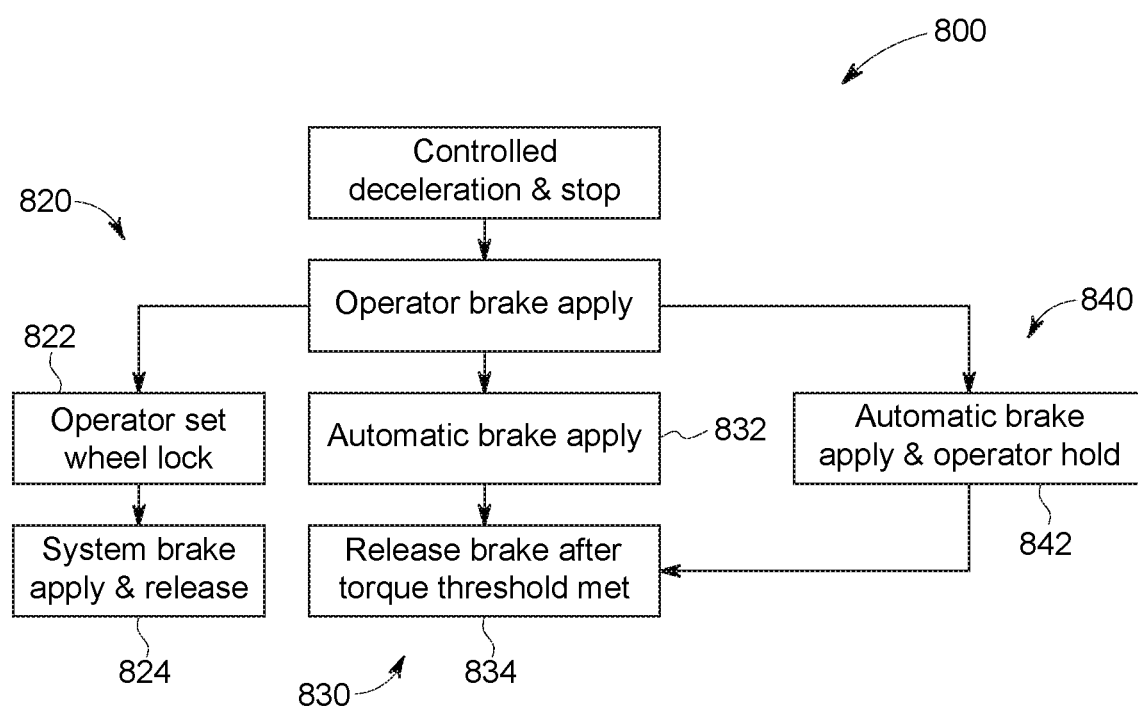
FIG. 8 is diagram illustrating a control routine for preventing vehicle rollback, according to yet another embodiment of the inventive subject matter.

In certain embodiments, both operator and automatic control can be utilized to transition from a stop to movement in a selected direction of travel without unintended rollback, as illustrated by the flowchart of a method 800 shown in FIG. 8. For example, as discussed above in connection with FIG. 4, after an operator releases the accelerator pedal, the controller 142 may determine a target maximum deceleration and control the drive system 100 to provide torque as needed to limit the maximum deceleration rate. This allows the vehicle to be reduced to a very low speed and maintain a commanded direction of travel, as illustrated at 810. An operator may then apply the service brake or park brake at zero speed to maintain the vehicle in a stationary condition, as shown at 812. From this stationary condition, various control strategies are contemplated that allow for some level of operator input when transitioning from the stationary condition to movement in a selected direction of travel.

A first control strategy 820 involves the operator setting wheel lock and releasing the previous-applied service or parking brake, at 822, in order to hold the vehicle stationary on grade. As shown at 824, both manual and automatic controls are then utilized to smoothly transition the vehicle from a stop to a selected direction of travel when an accelerator feedback is detected. In particular, the controller 142 is configured to first command the service or parking brake on when the wheel lock is on (from stop 822) and accelerator pedal feedback is above a threshold. The operator may then be prompted to disengage the wheel lock. Once, the wheel lock is turned off, the controller 142 is configured to automatically release the service or parking brake when an available torque threshold is met, as discussed in the embodiments described above (i.e., when enough torque is available to prevent rollback).

A second control strategy 830 involves the controller 142 automatically applying the service brakes, at 832, after the operator brings the vehicle to zero speed with the brakes. As discussed in the embodiments described above, at 834, controller 142 is configured to automatically release the brakes when the accelerator pedal is applied by an operator and the available torque exceeds a threshold level sufficient to prevent vehicle rollback. This control permits the vehicle to transition from the stationary condition to smooth movement in a selected direction of travel.

A third controls strategy 840 likewise involves the controller 142 automatically applying the service brakes, at 842, after the operator brings the vehicle to zero speed with the brakes. The operator may then hold the brakes on and apply the accelerator pedal to start the vehicle moving on grade. In connection with this condition, the controller 142 is configured to automatically release the brakes when the available torque exceeds a threshold level sufficient to prevent vehicle rollback, as shown at 834. In an embodiment, the brake pressure may slowly be lessened as balance torque is applied.

In an embodiment, when starting the vehicle on grade, either the operator (in a manual starting mode) or the controller 142 (in an automatic starting mode) may balance both brake and torque application to prevent rollback utilizing either a hydraulic brake that can be variably applied or a hydraulic brake with a restrictor valve. As torque is increased, the brake may be slowly eased off, for example, by decreasing the brake pressure. In this manner, the brake is operated similar to a clutch, whereby torque and brake application are balanced in order to prevent vehicle rollback and to smoothly transition to positive motion. In an embodiment, the brake may be a hydraulic brake having an associated restrictor valve controllable by the controller 142 so that brake pressure may be selectively decreased as torque is ramped. The torque ramp rate may be adjusted to match a learned brake pressure versus torque rate of the brake to maintain zero speed. The system may be configured to continue to adjust the applied torque ramp rate and brake pressure bleed down until the brake is fully released. In either case (i.e., hydraulic brake with variable apply or hydraulic brake with a restrictor valve), continued application of torque after the brake is fully released effects movement of the vehicle. If excessive vehicle movement is detected indicating a fault condition (e.g., accelerating too quickly), the brake may be automatically deployed to stop vehicle motion.

In addition to ensuring preventing vehicle rollback when stopping on grade and when starting on grade, the system and method of the inventive subject matter also allow for an increased level of control over the transition from forward motion to reverse motion, and vice versa. For example, an operator may request a direction change by switching the selector to an opposite direction at speed (e.g., forward to reverse, or reverse to forward), rather than commanding neutral when the drive system inverters are off. In this situation, the controller 142 is configured to determine if retard is entered based on a gravity force estimation and vehicle acceleration. In an embodiment, if traveling down significant grade, the controller 142 controls the drive system 100 to provide a controlled deceleration to zero speed. In particular, the controller 142 is configured to deny drive torque in a requested direction if the vehicle speed is in excess of a threshold and traveling in a direction opposite to the requested direction. Once the vehicle speed is brought below the threshold utilizing controlled deceleration, the controller 142 is configured to then apply the brake based on a received torque command, torque threshold on grade, and vehicle speed such that the brake is held on until the available torque in the new selected direction of travel is sufficient to prevent vehicle rollback.

If, however, the vehicle is traveling on a relatively flat surface, the controller 142 controls the drive system to switch to retard mode based on vehicle speed and acceleration and interprets the accelerator pedal feedback as retard command. The drive system 100 automatically brings the vehicle to a stop utilizing the service brakes based on a received torque command, torque threshold on grade, and vehicle speed such that the brake is held on until the available torque in the new selected direction of travel is sufficient to prevent vehicle rollback. If the propel command is inadequate to prevent rollback, the brakes are applied and held on to prevent rollback. If the propel command is adequate to prevent rollback, the vehicle is permitted to transition to motor in the manner discussed above.

Optionally, the drive system 100 and accompanying methods described herein can prevent vehicle rollback on a grade by applying direct current to alternating current motors of the vehicle. The controller 142 can determine a designated direct current amount from a previously determined amount or based on the payload, grade, and/or speed of the vehicle (moving up the grade). For heavier payloads, steeper grades, and/or faster speeds, the controller 142 can calculate a greater direct current amount. For lighter payloads, flatter grades, and/or slower speeds, the controller 142 can calculate a smaller direct current amount.

This determined amount of direct current is then applied or supplied to one or more alternating current motors 114, 116 of the drive system 100. In one embodiment, the amount of direct current applied to the motors 114, 116 is a maximum amount of direct current that the drive system 100 is capable of supplying to the motors 114, 116. Alternatively, the amount of direct current applied to the motors 114, 116 is less than the maximum amount of direct current that the drive system 100 is capable of supplying to the motors 114, 116. This current is applied to the motors 114, 116 without the brakes of the vehicle also being engaged or otherwise actuated. The direct current supplied to the motors 114, 116 prevents the motors 114, 116 from moving in an opposite direction (e.g., to cause or allow the vehicle to roll back down the grade). In this way, the direct current causes the motors 114, 116 to operate as brakes without any brake of the vehicle being applied. Optionally, one or more brakes of the vehicle also can be applied to hold the position of the vehicle.

The brakes that are applied (or any brakes that previously were applied) can be released with the direct current continuing to be supplied to the motors 114, 116. For example, the controller 142 can actuate or otherwise control a switch that controls flow of direct current to the motors 114, 116. Disengaging the brakes of the vehicle while maintaining application of the direct current to the motors 114, 116 can prevent the vehicle from rolling down the grade with the motors 114, 116 transitioning to slip control and generating a holding torque that counteracts gravity pulling the vehicle down the grade.

Optionally, the controller 142 can apply a maximum or 100% alternating current to the motors 114, 116 prior to the vehicle coming to a stop on the grade or rolling backward, and then apply one or more brakes of the vehicle before the vehicle comes to a complete stop. For example, while the vehicle is moving up the grade, the controller 142 can increase the alternating current supplied to the motors 114, 116 to a maximum amount that the drive system 100 can supply to the motors 114, 116 (without damaging the motors 114, 116) and then apply the brakes of the vehicle when the vehicle comes to a complete stop (e.g., when the speed of the vehicle is zero).

In another embodiment, the controller 142 can operate as a speed regulator when the vehicle is traveling up a grade and about to stop. The controller 142 can control the torque generated by the motors 114, 116 as the vehicle slows and is moving at slow speeds (e.g., no greater than six kilometers per hour or another speed). The controller 142 can supply current to the motors 114, 116 at basic excitation frequencies of the motors 114, 116 to control the motors 114, 116 and bring the vehicle to a stop on the grade, without the vehicle rolling back down the grade.

In another embodiment, the inventive subject matter provides a system and method for reducing the speed of a vehicle to zero using retarding effort provided by the traction motors of the vehicle. For example, initially, the vehicle may be moving in a desired direction of travel and an operator may request full/maximum retarding effort to stop the vehicle. If the retard request is through a lever or other means that does not require an operator to actively hold the lever to effect retarding of the vehicle, the traction motors slow the vehicle to a low, near zero speed and hold that low speed. If the retard request is through a spring-return pedal or similar mechanism, the traction motors slow the vehicle to a low, near zero speed and then the vehicle is stopped utilizing the service brakes. In an embodiment, the operator may then hold the vehicle stopped using a service brake or parking brake. In an embodiment, the operator may hold the vehicle stopped by continuous depression of the retard pedal, where applicable. In such a case, if the operator then releases the retard pedal, the controller 142 is configured to command the traction motors to maintain the stopped condition (zero speed) for a predetermined amount of time. If the vehicle is outfitted with an override switch, then after the delay accelerator pedal is allowed to control rollback speed with retard when depressed. If the vehicle does not have an override switch, then the vehicle is allowed to accelerate to an opposite motion threshold. If the operator applies the accelerator pedal, the zero-speed condition will continue to be held until a sufficient amount of torque is available to prevent rollback and get the vehicle moving in the desired direction of travel, as discussed above.

In connection with the above, in an embodiment, the vehicle may include an override switch that is configured to send an override signal to the controller 142 to enable an operator to disable the programmed control routines hereinbefore described. For example, at various times during operation of the vehicle, an operator may wish to take over full control of the vehicle rather than having the controller 142 dictate vehicle acceleration, deceleration, stoppage and movement. In particular, an operator may want to be able to coast in a direction opposite the selected direction of travel, such as when turning around on slight grade. In such a situation, the operator can depress the override button or otherwise enable override to disable the automatic brake-apply feature hereinbefore described and allow coast-back. In an embodiment, the controller 142 may still be configured to automatically apply the brakes or utilize the traction motors to slow the vehicle if the coast-back resulting from override results in an over-speed or over-acceleration condition (i.e., a speed or acceleration exceeds a safe threshold).

In an embodiment, the system of the inventive subject matter also includes a redundant braking or notification function that is automatically carried out in the event of drive system failure or fault. For example, if the drive system card fails or powers down suddenly while the vehicle is on grade, roll back will occur if the system does not apply the brakes. In such a scenario, the operator may not be paying attention and may assume that the brakes will automatically be applied to prevent rollback in accordance with the automatic control discussed above. The system may therefore be outfitted with a redundant braking function that is carried out automatically when drive system failure is detected and when vehicle speed exceeds a threshold before or after a rollback condition. In an embodiment, the brakes may be applied to control deceleration to zero speed. In an embodiment, the system may also be configured to output an audible or visual warning to an operator to let the operator now that the anti-rollback control described herein will not function. This provides an operator with an alert that the drive system will not be able to apply the brakes and that manual action is necessary to prevent a rollback condition. This safeguard ensures that an operator is paying attention and alerts an operator that the automatic, anti-rollback features are disabled.

In an embodiment, the control system of the inventive subject matter, by utilizing the functions hereinbefore described, is configured to provide for the controlled deceleration of a vehicle and automatic engagement of the service brakes while the vehicle is still moving in a desired direction of travel, to prevent vehicle rollback when coming to a stop. That is, the service brakes are applied in dependence upon vehicle acceleration/deceleration prior to crossing zero speed. The system of the inventive subject matter is further configured to prevent rollback when starting a vehicle from a stop on grade by determining a torque threshold to achieve a desired acceleration (rather than velocity) or by performing a maximum or preset target torque start instead of a threshold torque start. As a result of the control strategies presented herein, vehicles employing the control system of the inventive subject matter are more user friendly and require less skill to operate. In addition, the control system of the inventive subject matter may be retrofit into existing vehicles by modifying control software, and without significant hardware upgrades or modifications.

In an embodiment, a method for controlling a vehicle is provided. The method includes the steps of, while traveling on grade in a selected direction of travel, controlling at least one traction motor of the vehicle to provide a controlled deceleration of the vehicle, and automatically applying a service brake of the vehicle while the vehicle is moving in the selected direction of travel.

In another embodiment, a system is provided. The system includes a control unit configured to be electrically coupled to a drive system of a vehicle, the drive system including at least one traction motor for providing motive power to the vehicle, and a service brake associated with at least one wheel of the vehicle. In the absence of a command to provide the motive power in the selected direction of travel, the control unit is configured to automatically apply the service brake while the vehicle is moving in a selected direction of travel to prevent rollback of the vehicle.

In one embodiment, the controller 142 also is operable to prevent vehicle rollback when on grade or when engaging an overburden pile, through the automatic application of the service brakes 138, 140. With existing LED vehicles 10, when engaging an overburden pile, for example, after an operator releases the accelerator pedal, and before he/she can manually engage the service brakes, the spring tension in the bucket arm 18 and the incline the vehicle was on in the burden pile can cause the vehicle to inadvertently roll backward several feet. According to an embodiment of the inventive subject matter described herein, however, the control unit or controller 142 is configured to automatically apply the service brakes 138, 140 to hold the vehicle 10 at zero speed or near zero speed on grade and/or when pushing into an overburden/burden pile when a rollback condition is detected, without input from an operator of the vehicle, in order to prevent such inadvertent rollback. As used herein, "automatically" means without input or intervention from an operator of the vehicle. As used herein, "rollback condition" means a state or condition where vehicle movement in a direction opposite or different from a selected or desired direction of travel is possible in the absence of braking or depression of the accelerator pedal of the vehicle.

For example, in an embodiment, the controller 142 is configured to continuously or intermittently monitor or detect a selected direction of travel of the vehicle (i.e., forward or reverse) and the speed of the motor (e.g., one or more of the traction motors), and to immediately command the service brakes 138, 140 associated with the wheels 118, 120 of the vehicle 10 to engage when a rollback condition is detected. In an embodiment, a "rollback condition" is present when the motor speed, in a direction opposite or different from the selected direction of travel, exceeds a predetermined threshold. As used herein, "opposite or different from the selected direction of travel" means, for example, that the motor is rotating in a direction opposite than that required to effect movement of the vehicle in the selected direction of travel, or in a mode (e.g., regenerative braking mode) other than that required to propel the vehicle in the selected direction of travel.

In an embodiment, the threshold motor speed opposite or different from the direction of travel that prompts automatic application of the service brakes to prevent rollback may be between about 0 rpm and about 100 rpm in another embodiment, the threshold motor speed may be between about 10 rpm and about 90 rpm. In another embodiment, the threshold motor speed may be between about 20 rpm and about 80 rpm. In another embodiment, the threshold motor speed may be between about 30 rpm and about 70 rpm. In another embodiment, the threshold motor speed may be between about 40 rpm and about 60 rpm. In yet another embodiment, the threshold motor speed may be about 50 rpm in a direction opposite the selected direction of vehicle travel.

In an embodiment, the vehicle 10 has a fixed gear ratio of approximately 90:1, such that a 50 rpm threshold (in a direction opposite the selected direction of travel) to engage the service brakes would not be perceptible as movement to an observer or operator. In an embodiment, the controller 142 is configured to apply the service brakes 138, 140 to prevent rollback within approximately 100 milliseconds of detecting the vehicle rollback condition. In an embodiment, the brakes 138, 140 may be maintained by the controller 142 in a fully on or engaged state until the selected direction of travel is changed by an operator to match the direction of the motor and/or the accelerator pedal is depressed or actuated by an operator.

Figure 9:
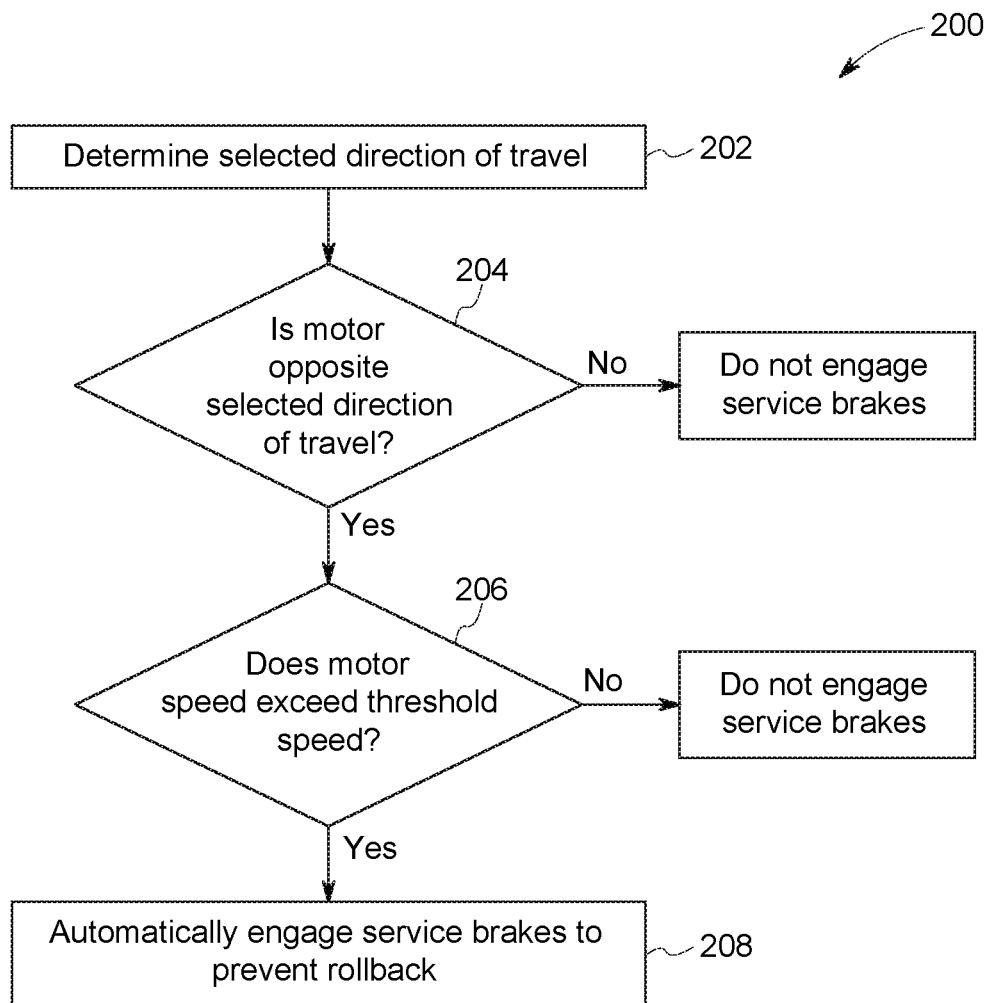
FIG. 9 is a diagram illustrating a control routine for preventing vehicle rollback, according to an embodiment of the inventive subject matter.

Referring now to FIG. 9, a method 200 of controlling a vehicle to prevent vehicle rollback according to an embodiment of the invention is illustrated. As shown therein, at 202, a selected direction of travel for the vehicle is detected and logged by the controller 142. The speed and direction of at least one of the traction motors (e.g., motors 114, 116 of the vehicle 10 is also monitored. At 204, the controller 142 determines whether or not the direction of the motor is opposite the selected direction of travel. If not, no automatic action regarding the application of service brakes is taken. If the motor direction is opposite the selected direction of travel, the controller 142 then (or simultaneously) determines, at 206, whether the motor speed exceeds a threshold speed. If not, no automatic action regarding the application of service brakes is taken. If, however, the detected speed of the motor in a direction opposite the selected direction of travel exceeds the threshold speed, then the controller 142 automatically engages the service brakes at step 208 to prevent rollback of the vehicle. As discussed above, the service brakes remain engaged until an operator of the vehicle changes the selected direction of travel to match the motor direction and/or the accelerator pedal is depressed by the operator.

Figure 10:
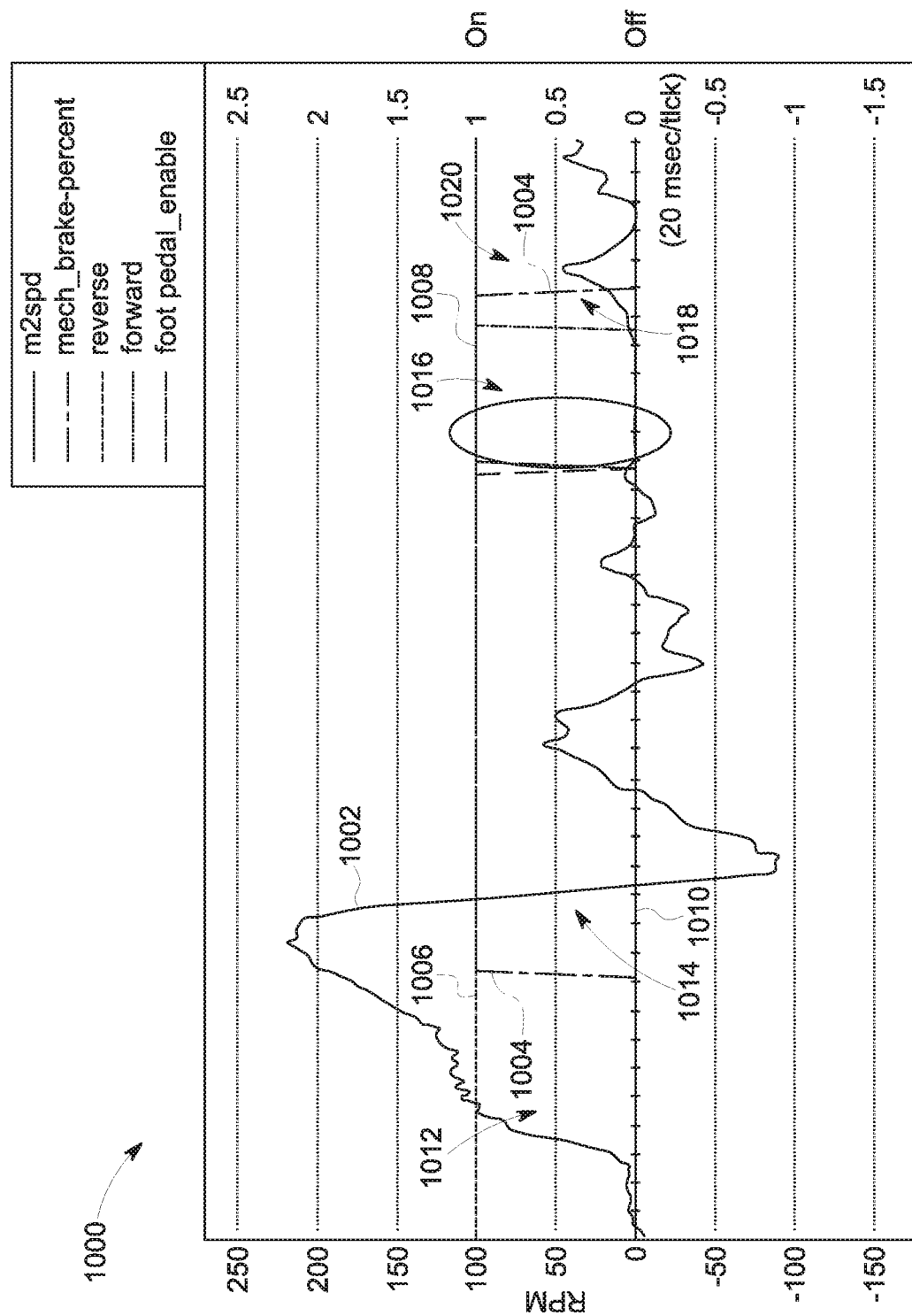
FIG. 10 is a graph illustrating operation of the system for preventing vehicle rollback, according to an embodiment of the inventive subject matter.

FIG. 10 shows a graph 1000 illustrating operation of the vehicle rollback prevention system, where line 1002 represents motor speed, line 1004 represents braking percent ON, line 1006 represents a "REVERSE" selected direction of travel, line 1008 represents a "FORWARD" selected direction of travel, and line 1010 represents depression of an accelerator pedal. At 1012, the forward motor speed exceeds the threshold motor speed of 50 rpm while the vehicle is operating in a selected reverse direction of travel. At 1014, the service brakes are then automatically actuated to 100% engagement/on by the controller to prevent vehicle rollback. At 1016, an operator (or the controller automatically) shifts the vehicle from reverse to forward, and at 1018 depresses the accelerator pedal to move the vehicle forward. At 1020, the controller then disengages the service brakes.

In an embodiment, the control system or controller of the present invention, by utilizing the functions hereinbefore described, is configured to automatically engage the service brakes whenever a rollback condition is sensed. This prevents the vehicle from rolling backwards on grade or when engaging an overburden pile or the like without the need for operator input or action, and ensures that when the vehicle is in the forward or reverse direction, movement of the vehicle in a direction other than in the selected direction is not possible. By managing vehicle movement in this manner, the control system of the inventive subject matter ensures that rollback or vehicle movement in a direction other than in a selected direction is prevented. As a result, vehicles employing the control system of the inventive subject matter are more user friendly and require less skill to operate. In addition, the control system of the inventive subject matter may be retrofit (e.g., added) into existing vehicles by modifying control software (e.g., to direct the controller to operate as described herein), and without significant hardware upgrades or modifications.

In an embodiment, a method for controlling a vehicle is provided. The method includes the steps of determining a selected direction of travel of the vehicle, monitoring a direction of operation of a motor of the vehicle, monitoring a speed of the motor, and automatically applying a service brake of the vehicle when a rollback condition is detected to prevent rollback of the vehicle. In an embodiment, the rollback condition is present when the direction of operation of the motor is different from the selected direction of travel. In an embodiment, the rollback condition is present when the speed of the motor exceeds a threshold speed. In an embodiment, the vehicle is a load-haul-dump vehicle. In an embodiment, the service brakes are hydraulic or pneumatic service brakes. In an embodiment, the method may also include the step of disengaging the service brake when the selected direction of travel matches the direction of operation of the motor and an accelerator pedal of the vehicle is depressed. In an embodiment, the threshold speed is between about 0 rpm and about 100 rpm. In yet other embodiments, the threshold speed is between about 40 rpm and about 60 rpm. In yet other embodiment, the threshold speed is about 50 rpm. In an embodiment, the vehicle has a fixed gear ratio of approximately 90:1.

In another embodiment, a system is provided. The system includes a control unit configured to be electrically coupled to a drive system of a vehicle, the drive system including at least one traction motor for providing motive power to the vehicle, and a service brake associated with at least one wheel of the vehicle. The control unit is configured to automatically apply the service brake when a rollback condition is detected to prevent rollback of the vehicle. In an embodiment, the control unit is configured to monitor a direction of operation of the at least one traction motor and a speed of the at least one traction motor. In an embodiment, the rollback condition is present when the direction of operation of the at least one traction motor is different from a direction of operation of the motor corresponding to a selected direction of travel of the vehicle, and the speed of the at least one traction motor exceeds a threshold speed. In an embodiment, the control unit is configured to disengage the service brake when the selected direction of travel matches the direction of operation of the at least one traction motor and an accelerator pedal of the vehicle is depressed. In an embodiment, the service brake is pneumatic or hydraulic brake. In an embodiment, the threshold speed is about 50 rpm. In an embodiment, the vehicle has a fixed gear ratio of approximately 90:1.

In yet another embodiment, a vehicle is provided. The vehicle includes a drive system including a traction motor connected in driving relationship to a wheel of the vehicle, the motor being configured to provide motive power to propel the vehicle in a selected direction of travel in a propel mode of operation, a controller electrically coupled to the drive system, and a friction brake associated with at least one wheel of the vehicle. The controller is configured to automatically engage the friction brake when a rollback condition is detected to prevent rollback of the vehicle. In an embodiment, the controller is configured to monitor a direction of operation of the motor and a speed of the motor. In an embodiment, the rollback condition is present when the direction of operation of the motor is different from the selected direction of travel of the vehicle, and the speed of the at least one traction motor exceeds a threshold speed. In an embodiment, the threshold speed is about 50 rpm and the vehicle has a fixed gear ratio of approximately 90:1. In an embodiment, the vehicle is a load-haul-dump vehicle.

Additional embodiments of the inventive subject matter relate to control systems and methods (e.g., braking control) for controlling transition from friction brakes to electrical effort (and vice versa) in a vehicle, to automate operation of the vehicle for starts and stops while loaded on an inclined (greater than zero degrees) grade. According to one aspect, for example, a control system (and related method) is configured for concurrent control of an electric drive system and a friction brake system of a vehicle to prevent rollback when the vehicle is operated to move from a stopped position on an inclined grade. According to another aspect, a control system (and related method) is configured for concurrent control of an electric drive system and a friction brake system of a vehicle, while traveling on an inclined grade, to bring the vehicle to a stop and hold the vehicle stopped.

Figure 11:
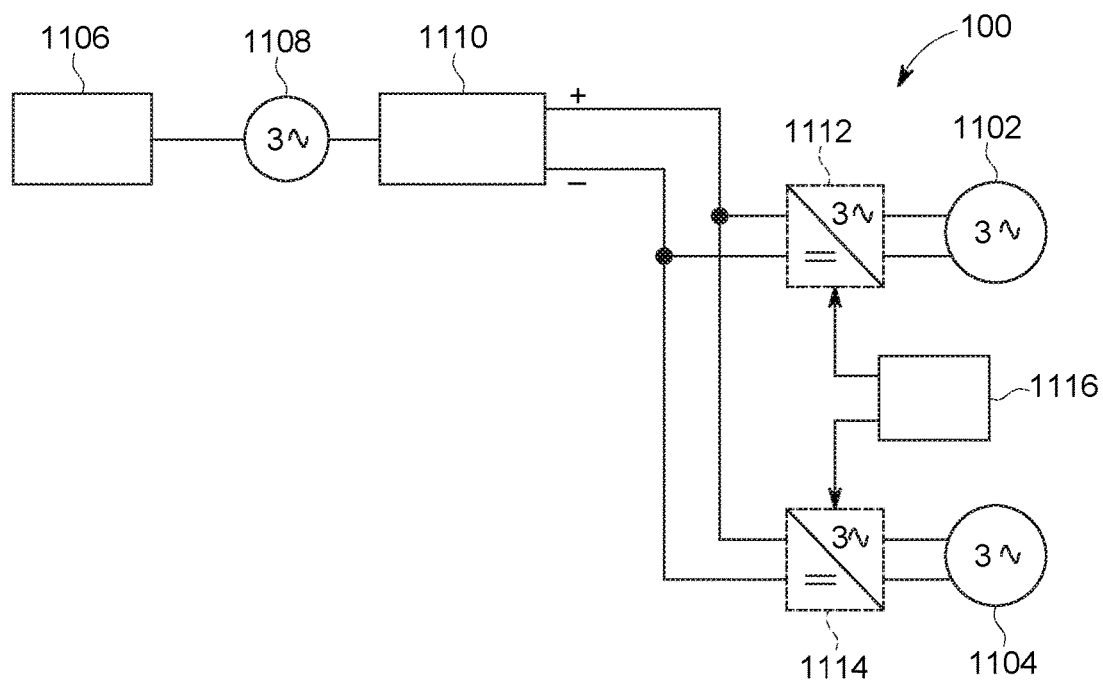
FIG. 11 is a schematic diagram of an electric drive and retarding system, according to an embodiment.

Another embodiment of the electric drive system 100 is shown in FIG. 11. The electric drive system 100 is at least partially housed within the vehicle 10, 30, and comprises a three-phase alternating current (AC) generator/alternator 1108 that is coupled to be mechanically driven by an engine 1106 (e.g., a diesel engine). An AC output of the generator 1108 is fed into one or more rectifiers 1110, which are configured to convert the AC output of the generator/alternator 1108 to a direct current (DC) output. The DC output of the rectifiers 1110 is supplied to a DC bus, which (among other loads) feeds into a set of inverters 1112, 1114. The inverters 1112, 1114 are configured to convert DC power from the DC bus into controlled three-phase, variable frequency AC power. Outputs of the inverters 1112, 1114 are electrically connected to electric motors 1102, 1104 (respectively), and the AC power output by the inverters 1112, 1114 has a waveform suitable for driving the electric motors 1102, 1104. The electric motors 1102, 1104 are operably coupled to the drive wheels (e.g., rear wheels) of a first set of wheels of the vehicle. For example, the motors 1102, 1104 may be three-phase, AC induction wheel motors. If a second set of wheels of the vehicle are drive wheels, then the electric drive system 100 can include additional inverters and electric motors coupled similarly to the inverters 1112, 1114 and motors 1102, 1104 in FIG. 11.

As further shown in FIG. 11, a drive system control unit or controller 1116 is electrically coupled to the electric drive system 100. For example, the drive system control unit may be connected to the inverters 1112, 1114. The drive system control unit 1116, among other tasks, is configured to determine and send a desired torque request signal to the inverters 1112, 1114. The torque request signal is processed by the control unit for the inverters 1112, 1114 to drive the motors 1102, 1104 to the desired torque output magnitude, and in the desired rotational direction corresponding to the intended direction of vehicle movement. The control unit is also configured to control the motors 1102, 1104 to provide retarding tractive effort to the wheels (e.g., rear wheels) to slow or stop the vehicle. In particular, when operating in an electric braking mode, also known as electric retarding, the electric motors 1102, 1104 are reversed to act as generators, and the drive wheels of the vehicle drive the electric motors 1102, 1104. Driving the motors 1102, 1104 places a torque on the drive wheels and causes them to slow, thus braking the vehicle. In an embodiment, the control unit 1116 includes one or more microprocessors operating according to a set of stored instructions to provide for vehicle control, as discussed in detail below and elsewhere herein.

Figure 12:
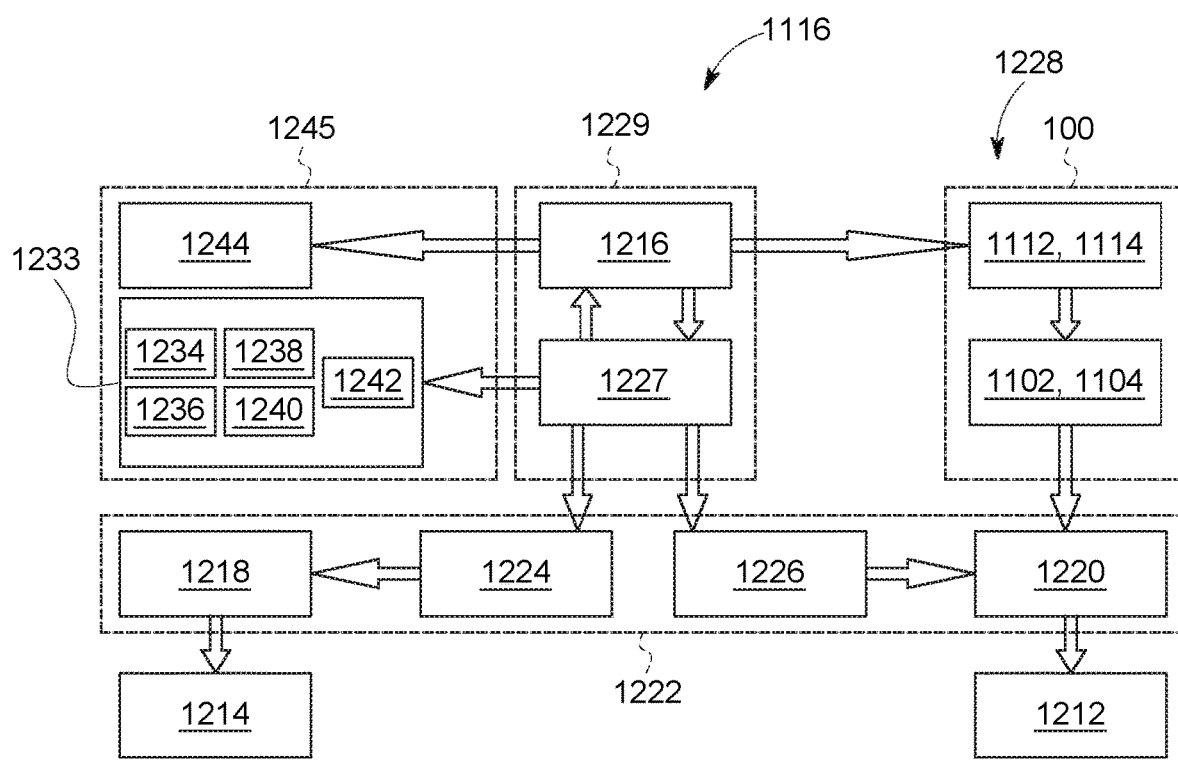
FIG. 12 is a block diagram illustrating a control system including hydraulic friction brakes and an electric retarder, according to an embodiment.

FIG. 12 shows an embodiment of the control system (e.g., braking control system) or control unit 1116 in more detail. The control system 1116 comprises a friction brake system 1222 that includes a first (e.g., rear) friction brake unit 1220 (e.g., friction brake actuation unit) associated with a first set of wheels 1212 (e.g., rear wheels) of the vehicle and a second (e.g., front) friction brake unit 1218 (e.g., friction brake actuation unit) associated with the second set of wheels 1214 (e.g., front wheels) of the vehicle. In an embodiment, a friction brake system 1216 is a hydraulic brake system, which further includes a first (e.g., rear) brake solenoid valve 1226 that is controllable to control the pressure of hydraulic fluid to the first friction brake unit 1220, and a second (e.g., front) brake solenoid valve 1224 that is controllable to control the pressure of hydraulic fluid to the second friction brake unit 1218. In other embodiments, other means for actuating the first and second friction brake units 1218, 1220 may also be utilized without departing from the broader aspects of the inventive subject matter. In either (or any) embodiment, each friction brake unit may include, for example, respective components for controllably applying a friction load to a moving part associated with a wheel 1212, 1214, e.g., brake pads operably coupled with a vehicle axle or brake disc/rotor, hydraulically-actuated calipers for applying a force to the brake pads against the disc/rotor, and so on. The control system 1116 further includes a friction brake control unit 1227 that is configured to control application of the first and second (e.g., rear and front) friction brake units 1220, 1218 at least partially in response to operator inputs, such as the depression of a brake pedal.

In an embodiment, the drive system control unit 1116 and friction brake control unit 1227 are electrically coupled to one another and may be generally referred to as one or more controllers 1229. While the drive system control unit 1116 and friction brake control unit 1227 are illustrated as separate components in FIG. 12, the control units 1116, 1227 may be integrated into a single control unit/controller/processor without departing from the broader aspects of the inventive subject matter.

As further shown in FIG. 12, the drive system control unit 1116 is electrically coupled to a drive-train 1228 of the vehicle 10, which includes the electric drive system 100, e.g., engine 1106, generator 1108, rectifier 1110, inverters 1112, 1114, and drive motors 1102, 1104 (AC induction wheel motors as shown in FIG. 11, or otherwise). When braking the vehicle 10 in an electric retarder braking mode, the control unit 1116 commands the electric drive system 100 (acting in effect as an electric retarding system that includes the inverters 1112, 1114, and motors 1102, 1104) to provide a requested desired vehicle retarding torque to the wheels.

As also shown in FIG. 12, one or both of drive system control unit 1116 and/or the friction brake control unit 1227 may be configured to receive inputs from an operator control 1233, e.g., an ignition switch 1234, an accelerator position transducer 1236, a brake pedal position transducer 1238, and/or a gear selector 1240, for operating the electric motors 1102, 1104 for driving and braking the vehicle 10. The ignition switch 1234 is operable to turn the vehicle on and off. The accelerator position transducer 1236 is configured to detect a position of an accelerator pedal or other actuator. The brake pedal position transducer 1238 is configured to detect a position of a brake pedal or other actuator. The gear selector 1240 provides a means for permitting an operator to select an intended or desired direction of vehicle movement, such as forward movement or reverse movement. In addition or alternatively, the operator control may comprise another type of input interface 1242, e.g., steering wheel or other steering controls, touchscreen or other computer interface, control input from a control system or autonomous controller, and so on. As further shown in FIG. 12, a display 1244 may be electrically coupled to the drive system control unit 1116 to allow an operator of the vehicle 10 to view status information relating to various vehicle systems. The display 1244 and operator control(s) 1233 collectively form an I/O (input/output) system 1245.

With further reference to FIG. 12, the control system 1116 is configured to automate the operation of the vehicle when starting and stopping, while loaded, on grade. In operation, when an operator of the vehicle (the operator may be a person or an autonomous controller) requests that the vehicle come to a stop, or that the vehicle moves in a certain direction (e.g., in either case through actuation of an operator control), the drive system control unit 1116 communicates with the friction brake control unit 1227 to control a transition from friction brakes to electrical effort/propulsion, and vice versa. In particular, the control system includes an interface between the drive system control unit 1116 and the friction brake control unit 1227 that allows the drive system control unit 1116 (e.g., in response to feedback or other information from the electric drive system 100) to request a specific braking effort from the friction brake control unit 1227. This interface also allows the drive system control unit 1116 to request from the friction brake control unit 1227 that friction braking effort be added or removed (i.e., increased or decreased). Thus, in embodiments, the drive system control unit 1116 is configured to communicate with the friction brake control unit 1227 to control an amount of a friction brake application during vehicle stops and starts. For example, the drive system control unit 1116 may be configured to communicate with the friction brake control unit to at least partially automatically control the amount of the friction brake application during vehicle stops and starts on an inclined grade on which the vehicle is positioned. (At least partial automatic control means fully automatic control, or automatic control responsive to, and based in part on, an operator input, e.g., a degree or rate of braking or acceleration that is responsive and proportional to a degree of change in position of a brake pedal or accelerator pedal.)

In connection with the above, the drive system control unit 1116 is configured to utilize system parameters to calculate the force needed to hold the vehicle 10 on the given inclined grade. The drive system control unit 1116 then determines when to request the friction brakes be released or more friction braking effort be added in dependence upon this determined force. The force may be determined based on various methods as outlined in the aforementioned U.S. patent application Ser. No. 14/464,226, filed 20 Aug. 2014. Alternatively or additionally, the control unit 1116 may be configured for the force to be determined based on information of the inclined grade as generated by an on-board inertial measurement unit, information on vehicle mass (e.g., determined from a weighing station, or from on-board, physics-based calculations from sensor data relating to vehicle acceleration under known conditions), other vehicle/system parameters (e.g., vehicle wheel radius), etc.

In embodiments, the control system 1116 also is configured to provide anti-rollback capabilities. In particular, the drive system control unit 1116 is configured to determine a torque level needed to move the vehicle from stop to up an inclined grade (i.e., the vehicle is stopped while on the inclined grade, and is then controlled to move up the inclined grade). The torque level may be determined based on the force, e.g., the torque level would be a level that at least just exceeds the force. Upon calculating the torque required (or at some point subsequent to calculating the torque), the drive system control unit 1116 communicates with the friction brake control unit 1227 to request removal of a friction brake application (i.e., amount of friction brake application=zero) to commence motion of the vehicle in the desired direction, without substantial rollback. Thus, in embodiments, the drive system control unit 1116 is further configured, responsive to an input from an operator control (for the vehicle to move up down the inclined grade), to communicate with the friction brake control unit 1227 to remove the friction brake application and concurrently control the electric drive system 100 to provide the electric motive power according to the torque level that is determined, for the vehicle to move from stop to up (or down) the inclined grade without substantial vehicle rollback.

The drive system control unit 1116 may be configured to communicate with the electric drive system and the friction brake control unit so that an amount and rate at which the friction brake application is removed (by the friction brake control unit controlling the friction brake system) is automatically controlled to be proportional or equivalent to an amount and rate at which additional torque is provided (by the electric drive system as controlled by the drive system control unit). For example, as the friction brake application is reduced by a particular amount, the torque is concurrently increased by an amount at least sufficient to offset the lowered friction brake application to prevent vehicle rollback until the friction brake application is completely removed, at which time additional torque is generated for the vehicle for move forward. (Without "substantial" vehicle rollback includes no vehicle rollback, and vehicle rollback below a threshold that is deemed to still meet designated safety guidelines, e.g., rollback of no more than 0.3 meters for certain haul truck applications.)

In other embodiments, the control system is alternatively or additionally configured to provide controlled stop capabilities, such as when a vehicle 10 is operating on grade. In particular, the drive system control unit 1116 is configured to calculate the force needed to hold the vehicle 10 on the given inclined grade, and, responsive to an input from an operator control for the vehicle to come to a stop while moving on the grade, to communicate with the friction brake control unit 1227 to increase the amount of friction brake application, in dependence at least in part upon the force that is determined, to bring the vehicle to a stop and hold the vehicle stopped on the grade. The drive system control unit 1116 may be further configured to calculate the force needed to bring the vehicle to a stop in the first place, and to simultaneously communicate with the friction braking control unit 1227 to request an amount (and rate) of friction brake application to stop and then hold the vehicle the inclined grade. Generally, such calculations may take into account vehicle mass, current rate/velocity of travel, degree of grade incline, etc. For example, the braking force required to bring a vehicle to a stop while traveling up a grade would depend on vehicle mass and rate of deceleration (change in velocity from current velocity to zero over a given distance) less a factor due to rolling friction/resistance less a factor due to the force of gravity on the grade. The braking force then required to then hold the vehicle stopped on the grade would depend on vehicle mass, the grade, etc. as discussed above.

In embodiments, application of the friction brake system to bring a vehicle to a stop and hold the vehicle stopped on an inclined grade is concurrent with a reduction in electric retarding. Here, the drive system control unit 1116 is configured to calculate the force needed to hold the vehicle 10 on the given inclined grade, and, concurrently with a reduction in the electric retarding, to communicate with the friction brake control unit to increase the amount of friction brake application, in dependence at least in part upon the force that is determined, to bring the vehicle to a stop and hold the vehicle stopped on the grade. Thus, as the vehicle is moving up an inclined grade, the drive system control unit 1116, responsive to an input from an operator control for the vehicle to come to a stop, may be configured to first initiate electric retarding, and as the retarding effort by the electric drive system is reduced as the vehicle slows, concurrently communicate with the friction brake control unit to increase the amount of friction brake application. After the vehicle comes to a complete stop, the amount of electric retarding may be zero, and in such a case the amount of friction brake application will be sufficient to hold the vehicle stopped on the inclined grade. The drive system control unit 1116 may be configured to automatically control the amount and rate by which the friction brake application increases concurrently with the decrease in electric retarding such that (i) an overall deceleration profile (change in velocity over time from a current non-zero velocity to zero velocity) of the vehicle is linear (and thereby smooth-seeming to human operators) and (ii) proportional in terms of rate to one or more inputs from an operator control, e.g., the drive system control unit would control the decrease in electric retarding and concurrent increase in friction braking to provide faster deceleration responsive to an input from an operator control for a higher degree/rate of braking versus an input from the operator control for a lower degree/rate of braking.

In embodiments, the control system is configured both for controlled stopping of a vehicle on an inclined grade, and anti-rollback as the vehicle is controlled to move forward (e.g., up the grade) from its stopped position. Here, the drive system control unit, responsive to a first input from an operator control for the vehicle to come to a stop while moving on the grade, is configured to determine the force (to hold the vehicle stopped on the grade), and (e.g., concurrently with a reduction in electric retarding) to communicate with the friction brake control unit to increase the amount of friction brake application, in dependence at least in part upon the force that is determined, to bring the vehicle to a stop and hold the vehicle stopped on the grade. The drive system control unit is further configured to determine a torque level needed to move the vehicle from stop to up the grade. The drive system control unit, responsive to a second input at the operator control for the vehicle to move up the grade, is further configured to: communicate with the friction brake control unit to remove the friction brake application; and concurrently control the electric drive system to provide the electric motive power according to the torque level that is determined, for the vehicle to move from stop to up the inclined grade without substantial vehicle rollback.

In another embodiment, a method of controlling a vehicle comprises, at a drive system control unit of the vehicle, controlling an electric drive system associated with at least a first set of wheels of the vehicle to selectively provide electric motive power to the at least the first set of wheels to propel the vehicle and electric retarding to slow the vehicle. The method further comprises, at the drive system control unit, determining a torque level needed to move the vehicle from stop to up an inclined grade. The method further comprises, at the drive system control unit, responsive to an input from an operator control for the vehicle to move up the grade, communicating with a friction brake control unit of the vehicle to remove a friction brake application that holds the vehicle stopped and concurrently controlling the electric drive system of the vehicle to provide the electric motive power according to the torque level that is determined, for the vehicle to move from stop to up the inclined grade without substantial vehicle rollback.

In another embodiment, a method of controlling a vehicle comprises, at a drive system control unit of the vehicle, controlling an electric drive system associated with at least a first set of wheels of the vehicle to selectively provide electric motive power to the at least the first set of wheels to propel the vehicle and electric retarding to slow the vehicle. The method further comprises, at the drive system control unit, determining a force needed to hold the vehicle on an inclined grade on which the vehicle is positioned. The method further comprises, at the drive system control unit, communicating with a friction brake control unit of the vehicle to decrease or increase an amount of friction brake application applied to at least one of the first set of wheels or a second set of wheels of the vehicle, in dependence at least in part upon the force that is determined to hold the vehicle on the inclined grade.

In another embodiment, a method of controlling a vehicle comprises, at a drive system control unit of the vehicle, controlling an electric drive system associated with at least a first set of wheels of the vehicle to selectively provide electric motive power to the at least the first set of wheels to propel the vehicle and electric retarding to slow the vehicle. The method further comprises, at the drive system control unit, determining a force needed to hold the vehicle on an inclined grade on which the vehicle is positioned. The method further comprises, at the drive system control unit, communicating with a friction brake control unit of the vehicle to decrease or increase an amount of friction brake application applied to at least one of the first set of wheels or a second set of wheels of the vehicle, in dependence at least in part upon the force that is determined to hold the vehicle on the inclined grade. The method further comprises, at the drive system control unit, receiving an input from an operator control for the vehicle to come to a stop while moving on the grade. The force is determined responsive to the input being received. The method further comprises, at the drive system control unit, communicating with the friction brake control unit to increase the amount of friction brake application, in dependence at least in part upon the force that is determined, to bring the vehicle to a stop and hold the vehicle stopped on the grade.

In another embodiment, a method of controlling a vehicle comprises, at a drive system control unit of the vehicle, controlling an electric drive system associated with at least a first set of wheels of the vehicle to selectively provide electric motive power to the at least the first set of wheels to propel the vehicle and electric retarding to slow the vehicle. The method further comprises, at the drive system control unit, determining a force needed to hold the vehicle on an inclined grade on which the vehicle is positioned. The method further comprises, at the drive system control unit, communicating with a friction brake control unit of the vehicle to decrease or increase an amount of friction brake application applied to at least one of the first set of wheels or a second set of wheels of the vehicle, in dependence at least in part upon the force that is determined to hold the vehicle on the inclined grade. The method further comprises, at the drive system control unit, receiving an input from an operator control for the vehicle to come to a stop while moving on the grade, wherein the force is determined responsive to the input being received. The method further comprises, at the drive system control unit, concurrently with a reduction in the electric retarding, communicating with the friction brake control unit to increase the amount of friction brake application, in dependence at least in part upon the force that is determined, to bring the vehicle to a stop and hold the vehicle stopped on the grade.

In another embodiment, a method of controlling a vehicle comprises, at a drive system control unit of the vehicle, controlling an electric drive system associated with at least a first set of wheels of the vehicle to selectively provide electric motive power to the at least the first set of wheels to propel the vehicle and electric retarding to slow the vehicle. The method further comprises, at the drive system control unit, determining a force needed to hold the vehicle on an inclined grade on which the vehicle is positioned. The method further comprises, at the drive system control unit, communicating with a friction brake control unit of the vehicle to decrease or increase an amount of friction brake application applied to at least one of the first set of wheels or a second set of wheels of the vehicle, in dependence at least in part upon the force that is determined to hold the vehicle on the inclined grade. The method further comprises, at the drive system control unit: receiving a first input from an operator control for the vehicle to come to a stop while moving on the grade (the force is determined responsive to the input being received); communicating with the friction brake control unit to increase the amount of friction brake application, in dependence at least in part upon the force that is determined, to bring the vehicle to a stop and hold the vehicle stopped on the grade; determining a torque level needed to move the vehicle from stop to up the grade; receiving a second input from the operator control for the vehicle to move up the grade; and responsive to receipt of the second input, communicating with the friction brake control unit to remove the friction brake application, and concurrently controlling the electric drive system to provide the electric motive power according to the torque level that is determined, for the vehicle to move from stop to up the inclined grade without substantial vehicle rollback.

In another embodiment, a method of controlling a vehicle comprises, at a drive system control unit of the vehicle, controlling an electric drive system associated with at least a first set of wheels of the vehicle to selectively provide electric motive power to the at least the first set of wheels to propel the vehicle and electric retarding to slow the vehicle. The method further comprises, at the drive system control unit, determining a force needed to hold the vehicle on an inclined grade on which the vehicle is positioned. The method further comprises, at the drive system control unit, communicating with a friction brake control unit of the vehicle to decrease or increase an amount of friction brake application applied to at least one of the first set of wheels or a second set of wheels of the vehicle, in dependence at least in part upon the force that is determined to hold the vehicle on the inclined grade. The method further comprises, at the drive system control unit: receiving a first input from an operator control for the vehicle to come to a stop while moving on the grade (the force is determined responsive to the input being received); concurrently with a reduction in the electric retarding, communicating with the friction brake control unit to increase the amount of friction brake application, in dependence at least in part upon the force that is determined, to bring the vehicle to a stop and hold the vehicle stopped on the grade; determining a torque level needed to move the vehicle from stop to up the grade; receiving a second input from the operator control for the vehicle to move up the grade; and responsive to receipt of the second input, communicating with the friction brake control unit to remove the friction brake application, and concurrently controlling the electric drive system to provide the electric motive power according to the torque level that is determined, for the vehicle to move from stop to up the inclined grade without substantial vehicle rollback.

As should be appreciated, therefore, the control system of the present invention helps resolve multiple issues relating to vehicle starts and controlled vehicle stop, on grade. In particular, embodiments of the control system may alleviate potentially unsafe vehicle movement during hill starts, such as unintentionally rolling backward on grade when commencing vehicle operation. Moreover, embodiments of the inventive subject matter may simplify the driving process for operators. Whereas typical vehicles require an operator to control three pedals to safely and smoothly start and stop on grade, a vehicle incorporating the control and braking system of the inventive subject matter only requires that an operator control a single pedal (or perhaps a brake pedal and an accelerator pedal), as the control system automates the starting and stopping processes via communication and cooperation between the electric drive system and the friction brake system.

Embodiments of the inventive subject matter also function to avoid rough stops that could potentially lead to equipment damage, and help bring the vehicle to a controlled stop by automatically controlling the transition from electric retarder braking to friction braking to hold the vehicle on grade. As a result, a vehicle incorporating the system is made easier to drive, and requires less expertise to operate. Moreover, easier to operate vehicles translate to smoother vehicle operation and less wear on components.

Embodiments of the inventive subject matter are applicable, as noted above, to relatively large vehicles, for example, haul trucks and other vehicles having a gross vehicle operating weight of at least 250 metric tons. However, while the inventive subject matter has been described with specific reference to OHV's and other large vehicles of this type, the inventive subject matter is not intended to be so limited in this regard. In particular, it is contemplated that the inventive subject matter is equally applicable to electric vehicles generally, including but not limited to, electric off-highway vehicles, automobiles, and the like.

As noted above, the vehicle operator may be a person or an autonomous controller. Thus, "operator control" includes both controls that are operably by a human, and controls (e.g., control signals/inputs) associated with a control system/autonomous controller.

In one embodiment, a vehicle control system includes a controller configured to determine an upper non-zero limit on deceleration of a vehicle. The controller is configured to determine the upper non-zero limit to prevent rollback of the vehicle down a grade being traveled up on by the vehicle. The upper non-zero limit on deceleration is determined by the controller based on a payload carried by the vehicle, a speed of the vehicle, and a grade of a route being traveled upon by the vehicle. The controller is configured to monitor the deceleration of the vehicle, and to automatically prevent the deceleration of the vehicle from exceeding the upper non-zero limit by controlling one or more of a brake or a motor of the vehicle. The controller also is configured to one or more of actuate the brake or supply current to the motor of the vehicle to prevent rollback of the vehicle while the vehicle is moving up the grade at a non-zero speed.

Optionally, the controller is configured to one or more of actuate the brake or supply current to the motor to prevent the rollback of the vehicle while an operator of the vehicle continues to actuate an acceleration input device.

Optionally, the controller is configured to one or more of actuate the brake or supply current to the motor to prevent the rollback of the vehicle subsequent to release of an acceleration input device of the vehicle by an operator.

Optionally, the controller is configured to monitor the deceleration of the vehicle while the vehicle is moving in a selected direction of travel. The controller also is configured to automatically prevent the deceleration of the vehicle from exceeding the upper non-zero limit by automatically controlling one or more of torque generated by the motor or actuation of the brake of the vehicle while the vehicle is moving in the selected direction of travel up the grade.

Optionally, the controller is configured to monitor the deceleration of the vehicle and automatically prevent the deceleration of the vehicle from exceeding the upper non-zero limit responsive to travel of the vehicle up the grade of the route that is a non-zero grade.

Optionally, the controller is configured to automatically prevent the deceleration of the vehicle from exceeding the upper non-zero limit responsive to the vehicle reaching a zero-speed condition and prior to the vehicle beginning to roll back down the grade.

Optionally, the controller is configured to automatically prevent the deceleration of the vehicle from exceeding the upper non-zero limit by actuating the brake of the vehicle. The controller also can be configured to subsequently release the brake and maintain a position of the vehicle on the grade and without the vehicle rolling back down the grade by controlling the motor of the vehicle.

Optionally, the motor of the vehicle is powered to propel the vehicle by an alternating current, and the controller can be configured to prevent rollback of the vehicle by applying a direct current to the motor.

Optionally, the controller is configured to prevent rollback of the vehicle by applying the direct current to the motor and not applying the brake of the vehicle.

Optionally, the controller is configured to prevent rollback of the vehicle by applying the direct current to the motor and also applying the brake of the vehicle.

Optionally, the controller is configured to monitor torque generated by the motor of the vehicle and to release the brake responsive to the torque generated by the motor exceeding a threshold torque needed to prevent rollback of the vehicle.

Optionally, the controller is configured to determine the upper non-zero limit responsive to a decrease in acceleration of the vehicle.

Optionally, the controller is configured to determine the upper non-zero limit such that the upper non-zero limit decreases for heavier payloads of the vehicle, slower speeds of the vehicle, or steeper grades of the route and such that the upper non-zero limit increases for lighter payloads of the vehicle, faster speeds of the vehicle, or flatter grades of the route.

In one embodiment, a method includes determining an upper non-zero limit on deceleration of a vehicle to prevent rollback of the vehicle down a grade being traveled up on by the vehicle. The upper non-zero limit on deceleration is determined based on a payload carried by the vehicle, a speed of the vehicle, and a grade of a route being traveled upon by the vehicle. The method also includes monitoring the deceleration of the vehicle and automatically preventing the deceleration of the vehicle from exceeding the upper non-zero limit by controlling one or more of a brake or a motor of the vehicle. Deceleration of the vehicle is prevented from exceeding the upper non-zero limit by one or more actuating the brake or supplying current to the motor of the vehicle to prevent rollback of the vehicle while the vehicle is moving up the grade at a non-zero speed.

Optionally, the deceleration of the vehicle is monitored while the vehicle is moving in a selected direction of travel. The deceleration of the vehicle can be automatically prevented from exceeding the upper non-zero limit by automatically controlling one or more of torque generated by the motor or actuation of the brake of the vehicle while the vehicle is moving in the selected direction of travel up the grade.

Optionally, monitoring the deceleration of the vehicle and automatically preventing the deceleration of the vehicle from exceeding the upper non-zero limit occur responsive to travel of the vehicle up the grade of the route that is a non-zero grade.

Optionally, automatically preventing the deceleration of the vehicle from exceeding the upper non-zero limit occurs responsive to the vehicle reaching a zero-speed condition and begins prior to the vehicle beginning to roll back down the grade.

Optionally, automatically preventing the deceleration of the vehicle from exceeding the upper non-zero limit occurs by actuating the brake of the vehicle. The method also can include subsequently releasing the brake and maintain a position of the vehicle on the grade and without the vehicle rolling back down the grade by controlling the motor of the vehicle.

Optionally, rollback of the vehicle is prevented by applying a direct current to the motor that is an alternating current motor.

In one embodiment, a vehicle control system includes a controller configured to determine a selected direction of travel of a vehicle, an operational direction of a motor of the vehicle, and an operational speed of the motor. The controller is configured to identify a rollback condition of the vehicle responsive to the operational direction of the motor of the vehicle being different from the selected direction of travel of the vehicle. The controller also is configured to automatically slow or stop movement of the vehicle by automatically actuating a brake of the vehicle responsive to the rollback condition being identified and the operational speed of the motor exceeding a designated, non-zero speed threshold.

Optionally, the controller is configured to identify a cessation of acceleration of the vehicle in the selected direction of travel, and the controller is configured to automatically slow or stop movement of the vehicle responsive to the rollback condition being identified, the operational speed of the motor exceeding the speed threshold, and the cessation of the acceleration of the vehicle being identified.

In one embodiment, a vehicle control system includes a controller configured to determine a lower limit on speed of a vehicle. The controller is configured to determine the lower limit to prevent rollback of the vehicle down a grade being traveled up on by the vehicle. The lower limit is determined by the controller based on a payload carried by the vehicle and a grade of a route being traveled upon by the vehicle. The controller is configured to monitor the speed of the vehicle and to automatically prevent the speed of the vehicle from falling below the lower limit by actuating a brake of the vehicle. The controller is configured to actuate the brake based on the speed of the vehicle and independent of acceleration of the vehicle. The controller also is configured to actuate the brake of the vehicle to prevent rollback of the vehicle while the vehicle is moving up the grade at a non-zero speed.

Optionally, the controller is configured to monitor the speed of the vehicle subsequent to release of an acceleration input device of the vehicle, and to automatically prevent the speed of the vehicle from falling below the lower limit subsequent to release of the acceleration input device.

Optionally, the controller is configured to monitor the speed of the vehicle while an operator continues to actuate or depress an acceleration input device of the vehicle, and to automatically prevent the speed of the vehicle from falling below the lower limit while the operator continues to actuate or depress the acceleration input device.

In one embodiment, a method includes receiving a throttle command representative of an operator-requested increase in a throttle setting of a vehicle while a brake of the vehicle is engaged, increasing a torque generated by one or more motors of the vehicle responsive to receiving the throttle command, and releasing the brake of the vehicle responsive to one or more of the torque generated by the one or more motors reaching a maximum available torque, the torque generated by the one or more motors reaching a target release acceleration, or expiration of a predetermined non-zero duration of time.

In one embodiment, a method includes determining whether a brake of a vehicle is released while the vehicle is in a stopped state on a grade of a route, responsive to determining that the brake is released, one or more of allowing the vehicle to roll back down the grade by no more than a designated, non-zero threshold distance or rapidly accelerating the vehicle using torque generated by one or more motors of the vehicle, and smoothly transitioning movement of the vehicle up the grade by adjusting the torque generated by the one or more motors subsequent to the one or more of allowing the vehicle to roll down the grade or rapidly accelerating the vehicle.

In one embodiment, a method includes (while one or more brakes of a vehicle in a stationary position on a grade are engaged) repeatedly determining whether an operator input to release the one or more brakes is received during a blanking interval, releasing the one or more brakes of the vehicle responsive to not receiving the operator input to release the one or more brakes during the blanking interval, and automatically generating torque with one or more motors of the vehicle to propel the vehicle up the grade.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to those of skill in the art upon reviewing the above description. As used herein, the terms "including" and "in which" are used as the plain-English equivalents of the respective terms "comprising" and "wherein." Moreover, terms such as "first," "second," "third," "upper," "lower," "bottom," "top," etc. are used merely as labels, and are not intended to impose numerical or positional requirements on their objects.

This written description uses examples to disclose several embodiments of the inventive subject matter, including the best mode, and also to enable one of ordinary skill in the art to practice the embodiments of inventive subject matter, including making and using any devices or systems and performing any incorporated methods.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system and method without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A vehicle control system comprising:
a controller configured to determine an upper non-zero limit on deceleration of a vehicle, the controller configured to determine the upper non-zero limit to prevent rollback of the vehicle down a grade being traveled up on by the vehicle, the upper non-zero limit on deceleration determined by the controller based on a payload carried by the vehicle, a speed of the vehicle, and a grade of a route being traveled upon by the vehicle,
wherein the controller is configured to monitor the deceleration of the vehicle, the controller configured to automatically prevent the deceleration of the vehicle from exceeding the upper non-zero limit by applying a direct current to an alternating current motor of the vehicle, and wherein the controller configured to supply the direct current to the motor of the vehicle to prevent rollback of the vehicle while the vehicle is moving up the grade at a non-zero speed.

2. The vehicle control system of claim 1, wherein the controller is configured to supply the direct current to the motor to prevent the rollback of the vehicle while an operator of the vehicle continues to actuate an acceleration input device or subsequent to release of an acceleration input device of the vehicle by the operator.

3. The vehicle control system of claim 1, wherein the controller is configured to monitor the deceleration of the vehicle while the vehicle is moving in a selected direction of travel, the controller also configured to automatically prevent the deceleration of the vehicle from exceeding the upper non-zero limit by automatically controlling one or more of torque generated by the motor or actuation of a brake of the vehicle while the vehicle is moving in the selected direction of travel up the grade.

4. The vehicle control system of claim 1, wherein the controller is configured to monitor the deceleration of the vehicle and automatically prevent the deceleration of the vehicle from exceeding the upper non-zero limit responsive to travel of the vehicle up the grade of the route that is a non-zero grade or responsive to the vehicle reaching a zero-speed condition and prior to the vehicle beginning to roll back down the grade.

5. The vehicle control system of claim 1, wherein the controller is configured to automatically prevent the deceleration of the vehicle from exceeding the upper non-zero limit responsive to the vehicle reaching a zero-speed condition and prior to the vehicle beginning to roll back down the grade.

6. The vehicle control system of claim 5, wherein the controller is configured to prevent rollback of the vehicle by applying the direct current to the motor and not applying a brake of the vehicle.

7. The vehicle control system of claim 5, wherein the controller is configured to prevent rollback of the vehicle by applying the direct current to the motor and also applying a brake of the vehicle.

8. The vehicle control system of claim 1, wherein the controller is configured to automatically prevent the deceleration of the vehicle from exceeding the upper non-zero limit by actuating a brake of the vehicle, and the controller is configured to subsequently release the brake and maintain a position of the vehicle on the grade and without the vehicle rolling back down the grade by controlling the motor of the vehicle.

9. The vehicle control system of claim 1, wherein the controller is configured to monitor torque generated by the motor of the vehicle and to release a brake of the vehicle responsive to the torque generated by the motor exceeding a threshold torque needed to prevent rollback of the vehicle.

10. The vehicle control system of claim 1, wherein the controller is configured to determine the upper non-zero limit responsive to a decrease in acceleration of the vehicle.

11. The vehicle control system of claim 1, wherein the controller is configured to determine the upper non-zero limit such that the upper non-zero limit decreases for heavier payloads of the vehicle, slower speeds of the vehicle, or steeper grades of the route and such that the upper non-zero limit increases for lighter payloads of the vehicle, faster speeds of the vehicle, or flatter grades of the route.

12. A method comprising:
determining an upper non-zero limit on deceleration of a vehicle to prevent rollback of the vehicle down a grade being traveled up on by the vehicle, the upper non-zero limit on deceleration determined based on a payload carried by the vehicle, a speed of the vehicle, and a grade of a route being traveled upon by the vehicle;
monitoring the deceleration of the vehicle; and
automatically preventing the deceleration of the vehicle from exceeding the upper non-zero limit by applying a direct current to an alternating current motor of the vehicle,
wherein deceleration of the vehicle is prevented from exceeding the upper non-zero limit by supplying the direct current to the alternating current motor of the vehicle to prevent rollback of the vehicle while the vehicle is moving up the grade at a non-zero speed.

13. The method of claim 12, wherein the deceleration of the vehicle is monitored while the vehicle is moving in a selected direction of travel, and wherein the deceleration of the vehicle is automatically prevented from exceeding the upper non-zero limit by automatically controlling torque generated by the motor while the vehicle is moving in the selected direction of travel up the grade.

14. The method of claim 12, wherein monitoring the deceleration of the vehicle and automatically preventing the deceleration of the vehicle from exceeding the upper non-zero limit occur responsive to travel of the vehicle up the grade of the route that is a non-zero grade.

15. The method of claim 12, wherein automatically preventing the deceleration of the vehicle from exceeding the upper non-zero limit occurs responsive to the vehicle reaching a zero-speed condition and begins prior to the vehicle beginning to roll back down the grade.

16. A vehicle control system comprising:
a controller configured to determine a selected direction of travel of a vehicle, an operational direction of an alternating current motor of the vehicle, and an operational speed of the alternating current motor, the controller configured to identify a rollback condition of the vehicle responsive to the operational direction of the motor of the vehicle being different from the selected direction of travel of the vehicle,
wherein the controller also is configured to automatically slow or stop movement of the vehicle by applying a direct current to an alternating current motor responsive to the rollback condition being identified and the operational speed of the alternating current motor exceeding a designated, non-zero speed threshold.

17. The vehicle control system of claim 16, wherein the controller is configured to identify a cessation of acceleration of the vehicle in the selected direction of travel, and the controller is configured to automatically slow or stop movement of the vehicle responsive to the rollback condition being identified, the operational speed of the motor exceeding the speed threshold, and the cessation of the acceleration of the vehicle being identified.

18. A vehicle control system comprising:
a controller configured to determine a lower limit on speed of a vehicle, the controller configured to determine the lower limit to prevent rollback of the vehicle down a grade being traveled up on by the vehicle, the lower limit determined by the controller based on a payload carried by the vehicle and a grade of a route being traveled upon by the vehicle,
wherein the controller is configured to monitor the speed of the vehicle and to automatically prevent the speed of the vehicle from falling below the lower limit by actuating a brake of the vehicle, the controller configured to actuate the brake based on the speed of the vehicle and independent of acceleration of the vehicle, and wherein the controller configured to apply a direct current to an alternating current to prevent rollback of the vehicle while the vehicle is moving up the grade at a non-zero speed.

19. The vehicle control system of claim 18, wherein the controller is configured to monitor the speed of the vehicle subsequent to release of an acceleration input device of the vehicle, and to automatically prevent the speed of the vehicle from falling below the lower limit subsequent to release of the acceleration input device.

20. The vehicle control system of claim 18, wherein the controller is configured to monitor the speed of the vehicle while an operator continues to actuate or depress an acceleration input device of the vehicle, and to automatically prevent the speed of the vehicle from falling below the lower limit while the operator continues to actuate or depress the acceleration input device.

* * * * *